United States Patent
Kinouchi

(10) Patent No.: US 11,005,982 B2
(45) Date of Patent: May 11, 2021

(54) INFORMATION PROCESSING TERMINAL

(71) Applicant: XLeap, Inc., Tokyo (JP)

(72) Inventor: Takashi Kinouchi, Tokyo (JP)

(73) Assignee: XLEAP, INC., Tokyo (JP)

( * ) Notice: Subject to any disclaimer, the term of this patent is extended or adjusted under 35 U.S.C. 154(b) by 0 days.

(21) Appl. No.: 16/911,337

(22) Filed: Jun. 24, 2020

(65) Prior Publication Data

US 2020/0344340 A1 Oct. 29, 2020

Related U.S. Application Data

(62) Division of application No. 16/327,971, filed as application No. PCT/JP2017/031277 on Aug. 30, 2017.

(30) Foreign Application Priority Data

Aug. 30, 2016 (JP) .................................. 2016-168212

(51) Int. Cl.
*H04M 1/02* (2006.01)
*G03B 17/02* (2021.01)
(Continued)

(52) U.S. Cl.
CPC .......... *H04M 1/0264* (2013.01); *G03B 15/00* (2013.01); *G03B 17/02* (2013.01); *G03B 17/04* (2013.01); *H04M 1/0266* (2013.01); *H04N 5/225* (2013.01)

(58) Field of Classification Search
CPC ............. H04M 1/0216; H04M 1/0214; H04M 1/0264; H04M 2250/52; H04M 1/04;
(Continued)

(56) References Cited

U.S. PATENT DOCUMENTS 7,450,841 B2 * 11/2008 Jung ..................... G03B 17/04
348/333.06
8,159,592 B2 * 4/2012 Joo ..................... H04M 1/0264
348/333.06
(Continued)

FOREIGN PATENT DOCUMENTS

JP 2000295504 A 10/2000
JP 2001-051799 A 2/2001
(Continued)

OTHER PUBLICATIONS

International Search Report issued in PCT/JP2017/031277; dated Nov. 28, 2017.
(Continued)

*Primary Examiner* — Dung Hong
(74) *Attorney, Agent, or Firm* — Muncy, Geissler, Olds and Lowe, P.C.

(57) ABSTRACT

Provided is a mobile information terminal that allows a high-performance camera to be directed in any arbitrary direction relative to the terminal body and that allows photographing to be performed in a free position, while allowing for the viewing of a camera viewpoint image.
An information processing terminal 1 comprises: a camera 21 serving as an image capture unit for capturing an image of a subject; a body part 11 having a front surface 11a which is a predetermined surface on which a display unit 13 for displaying a captured image including the subject captured by the image capture unit is disposed; and a coupling part 12 that directly or indirectly couples the image capture unit relatively rotatably to the body part 11 via a plurality of rotation axes including a pivot axis Z1 that is a first rotation axis for changing an angle formed by an optical axis direction of the image capture unit and the normal direction
(Continued)

to the display unit 13, and a pivot axis Z3 that is a second rotation axis in a direction different from the first rotation axis.

1 Claim, 33 Drawing Sheets

(51) Int. Cl.
  *G03B 17/04* (2021.01)
  *G03B 15/00* (2021.01)
  *H04N 5/225* (2006.01)
(58) Field of Classification Search
  CPC .. H04M 1/0245; H04M 1/026; H04M 1/0212; H04M 1/0218; H04M 1/0247; H04M 1/022; H04M 1/03; H04N 5/2251; H04N 5/2252; H04N 2213/001; H04N 5/2257; G03B 17/561; G03B 37/04; G03B 17/04
  See application file for complete search history.

(56) References Cited

U.S. PATENT DOCUMENTS

| | | | | |
|---|---|---|---|---|
| 8,600,438 | B2* | 12/2013 | Goebel | H04N 5/2259 455/557 |
| 2006/0088310 | A1* | 4/2006 | Jung | G03B 17/04 396/429 |
| 2007/0253703 | A1* | 11/2007 | Tsai | G06F 1/1686 396/429 |
| 2008/0102901 | A1* | 5/2008 | Kimura | H04M 1/0247 455/566 |
| 2009/0115881 | A1* | 5/2009 | Joo | H04N 5/2252 348/333.06 |
| 2010/0053409 | A1* | 3/2010 | Chang | G06F 1/1605 348/333.01 |
| 2010/0142130 | A1* | 6/2010 | Wang | F16M 11/10 361/679.01 |
| 2015/0201160 | A1* | 7/2015 | Polyakov | H04N 5/23299 348/14.03 |
| 2015/0222819 | A1 | 8/2015 | Sadatsuki | |
| 2016/0147266 | A1* | 5/2016 | Chng | G06F 1/1677 713/100 |
| 2016/0241686 | A1 | 8/2016 | Zhang et al. | |
| 2016/0335981 | A1* | 11/2016 | Koo | G06F 3/147 |

FOREIGN PATENT DOCUMENTS

| | | | |
|---|---|---|---|
| JP | 2001-136254 A | | 5/2001 |
| JP | 2001136254 A | * | 5/2001 |
| JP | 2006-311196 A | | 11/2006 |
| JP | 2008067228 A | | 3/2008 |
| JP | 2008-131555 A | | 6/2008 |
| JP | 2012186524 A | | 9/2012 |
| JP | 2014-036434 A | | 2/2014 |
| JP | 2015-145961 A | | 8/2015 |
| JP | 2016-076850 A | | 5/2016 |
| JP | 2016076850 A | * | 5/2016 |

OTHER PUBLICATIONS

An Office Action mailed by the Japanese Patent Office dated Jul. 9, 2019, which corresponds to Japanese Patent Application No. 2018-537372 and is related to U.S. Appl. No. 16/327,971.

An Office Action mailed by the Japanese Patent Office dated Nov. 26, 2019, which corresponds to Japanese Patent Application No. 2018-537372 and is related to U.S. Appl. No. 16/327,971; with English language translation.

An Office Action mailed by the Japanese Patent Office dated Feb. 25, 2020, which corresponds to Japanese Patent No. 2018-537372 and is related to U.S. Appl. No. 16/327,971 with English language translation.

The extended European search report issued by the European Patent Office dated Mar. 17, 2020, which corresponds to European Patent Application No. 17846619.9-1208 and is related to U.S. Appl. No. 16/327,971.

\* cited by examiner

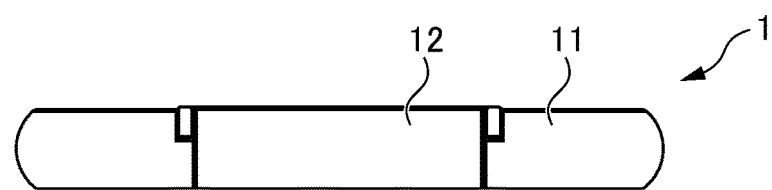
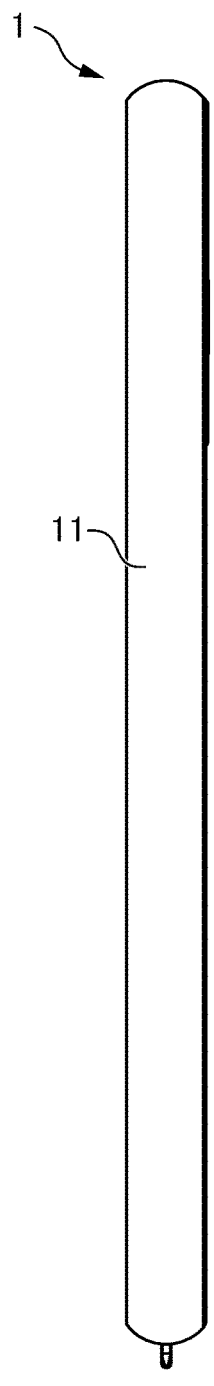
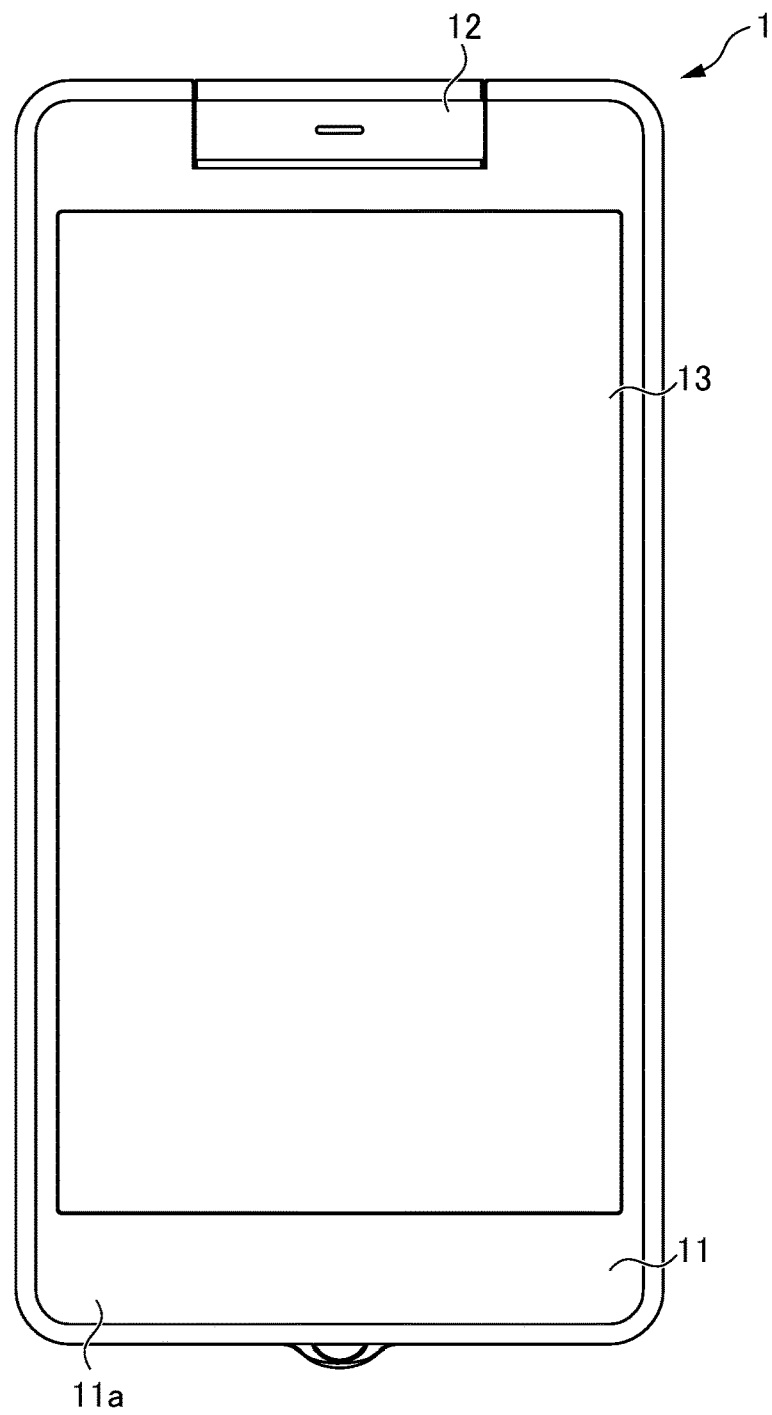

FIG. 2A
FIG. 2B
FIG. 2C
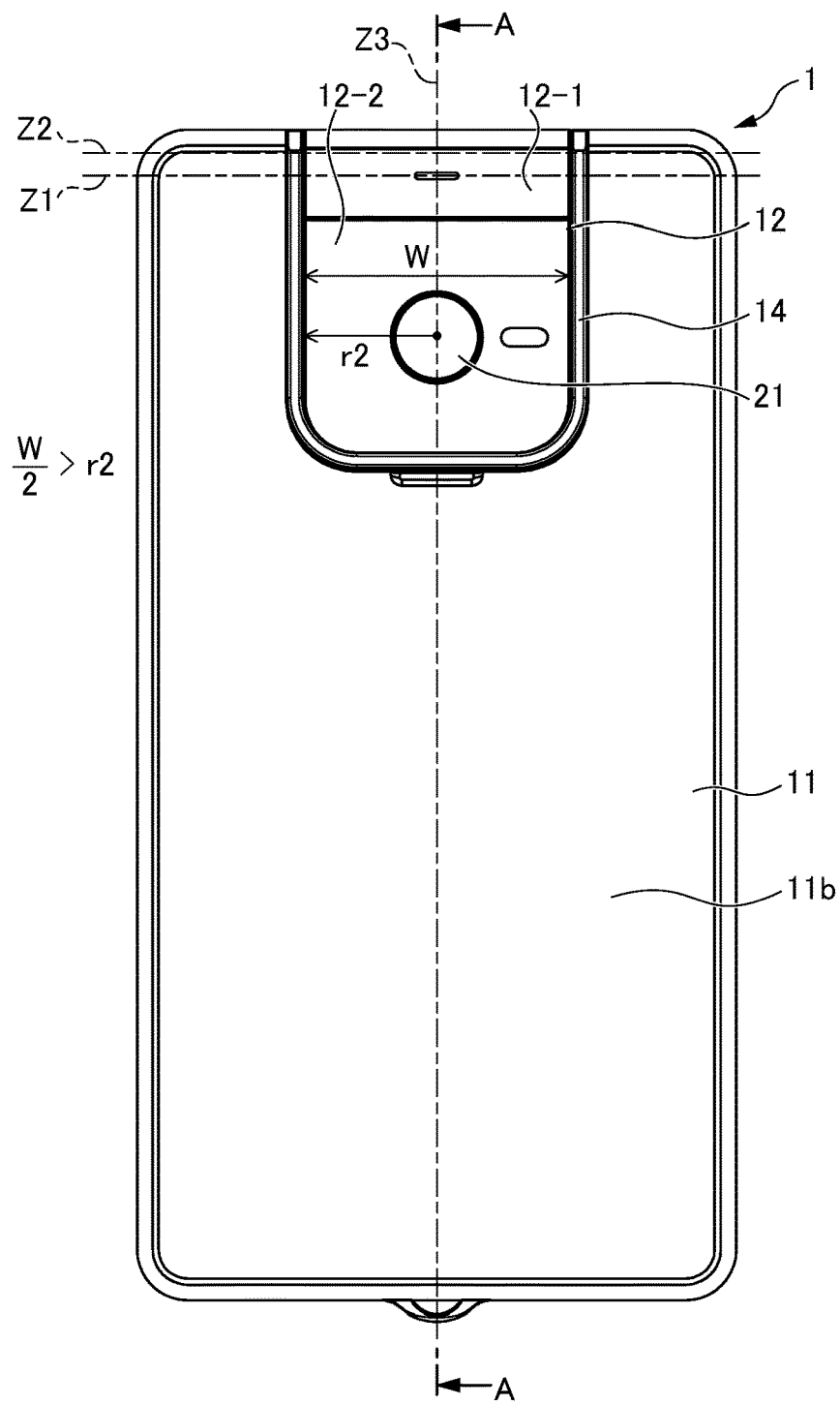
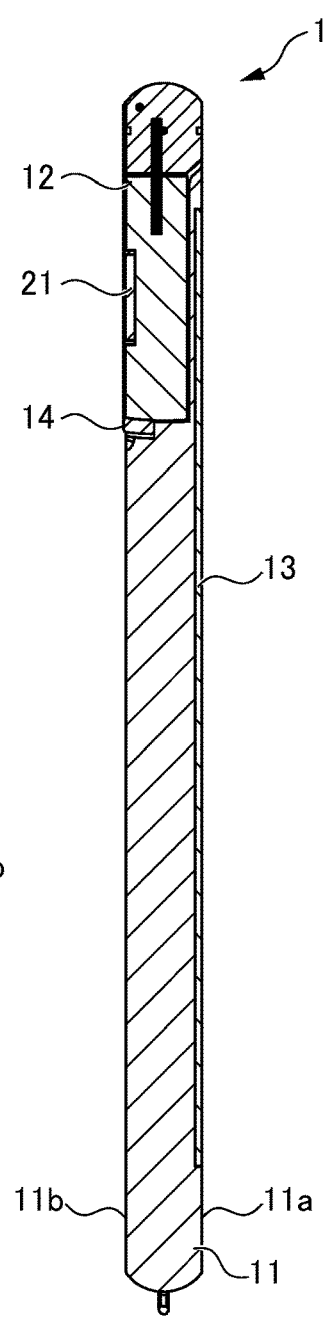
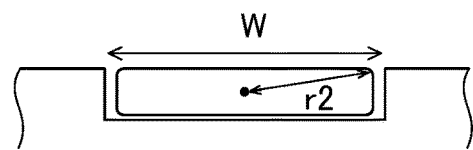

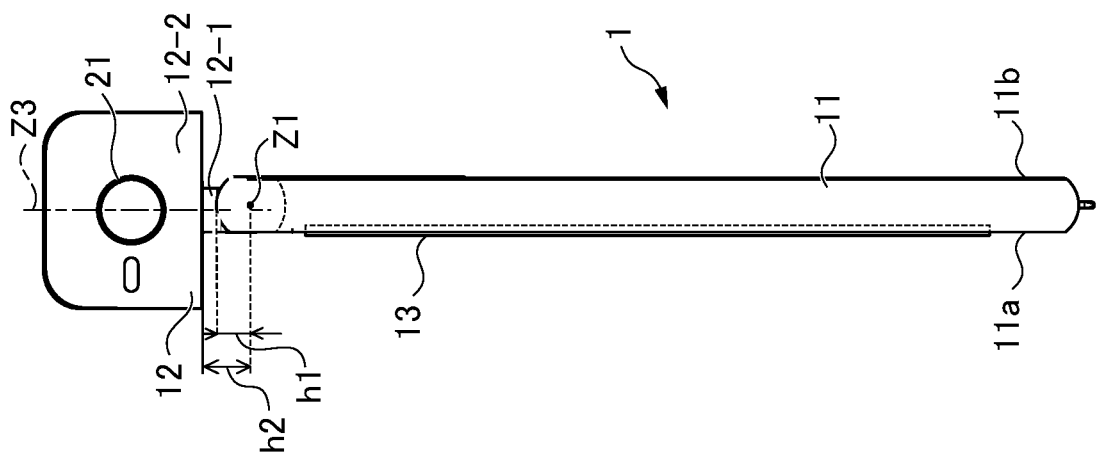
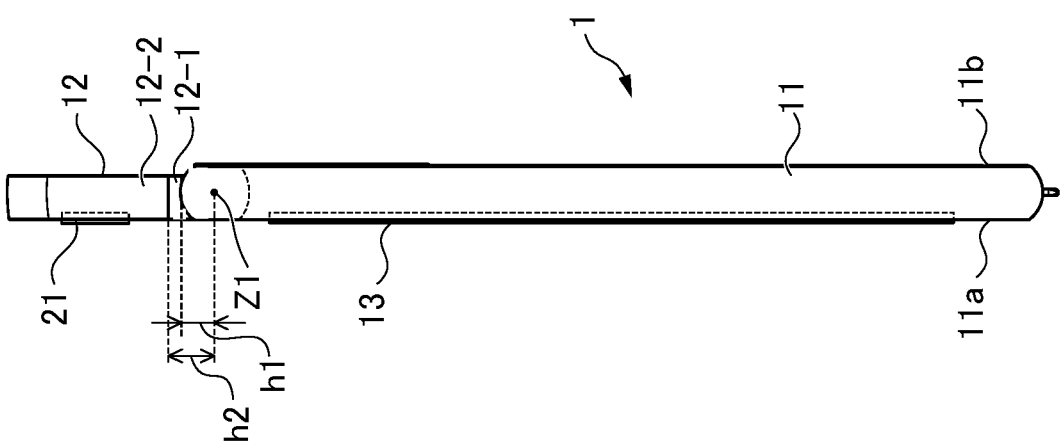
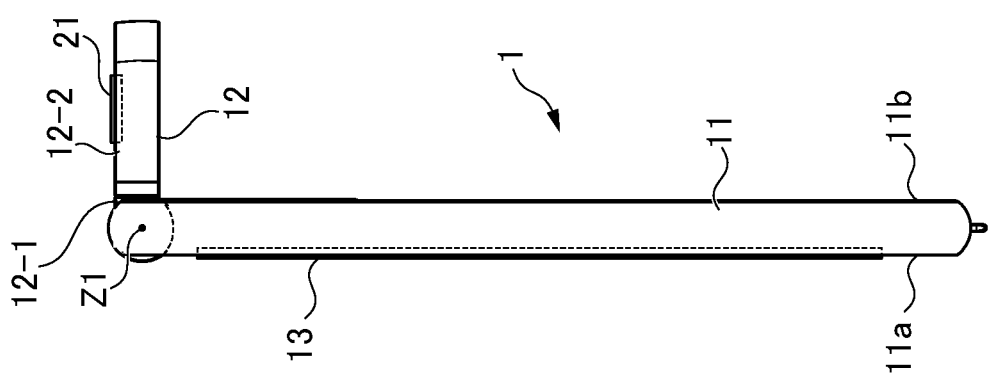

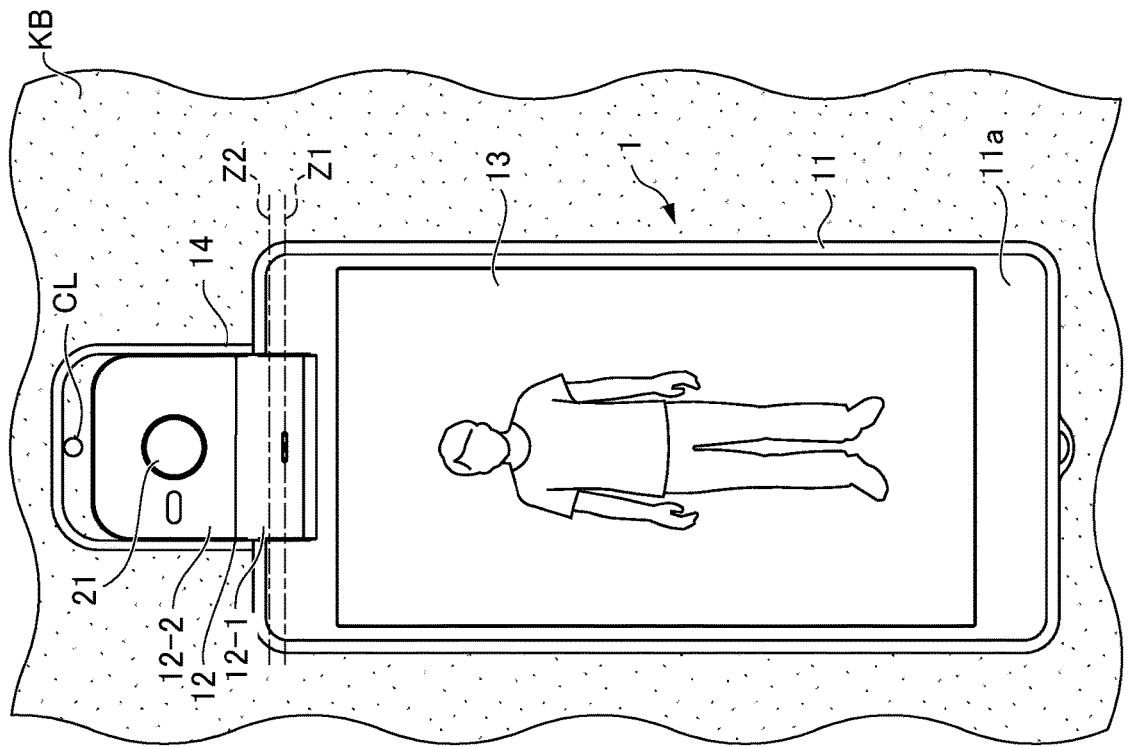
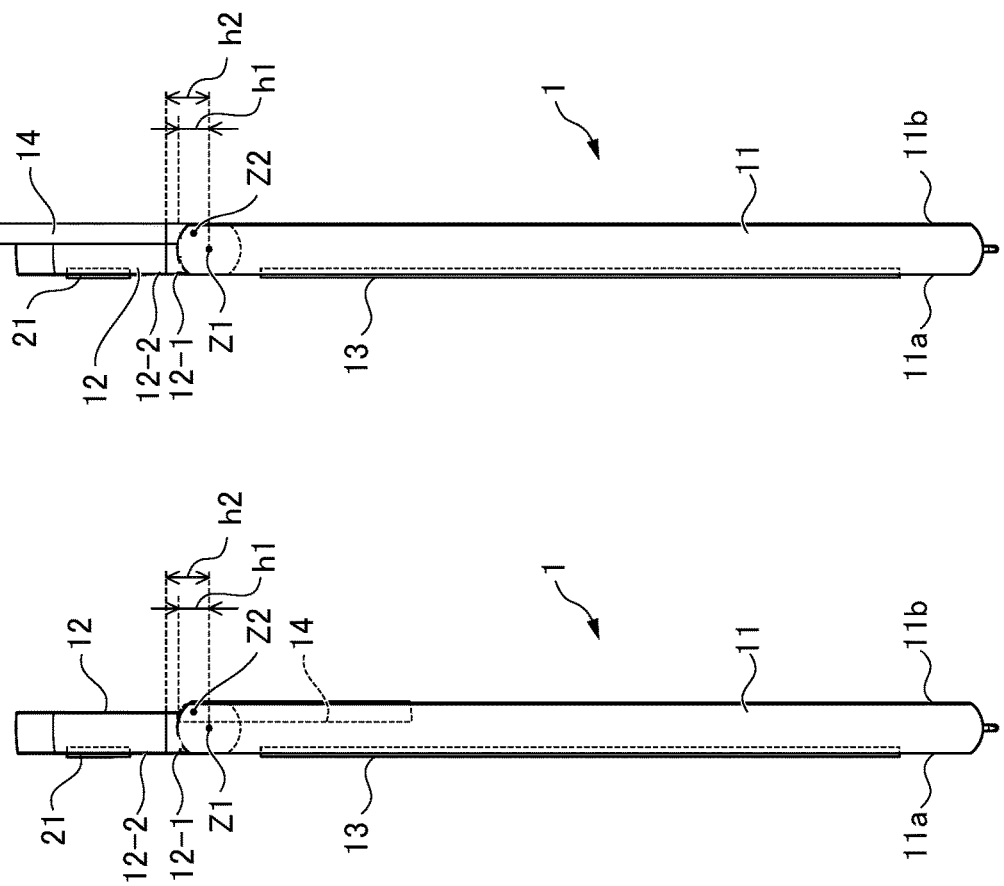

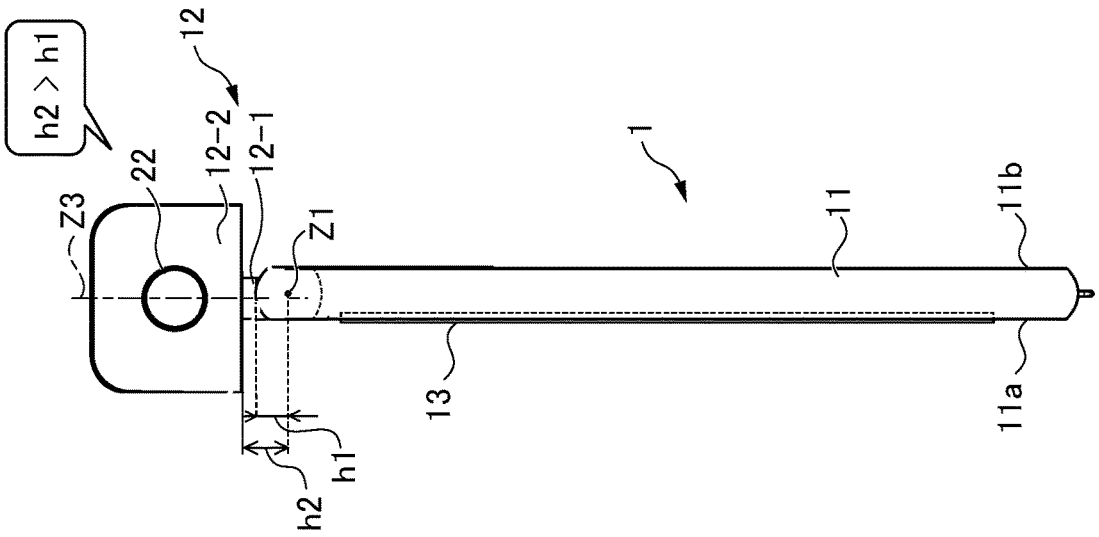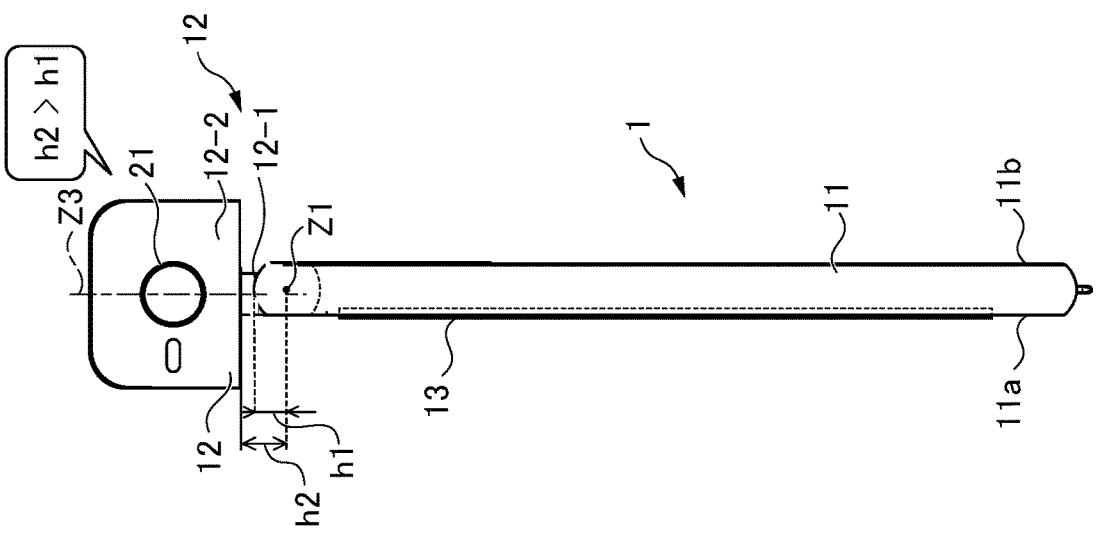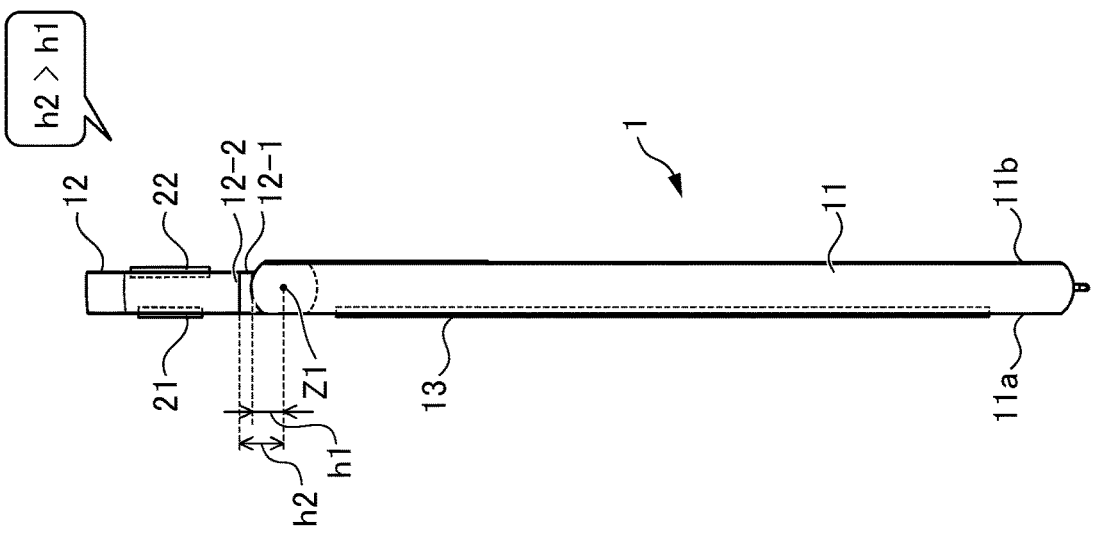

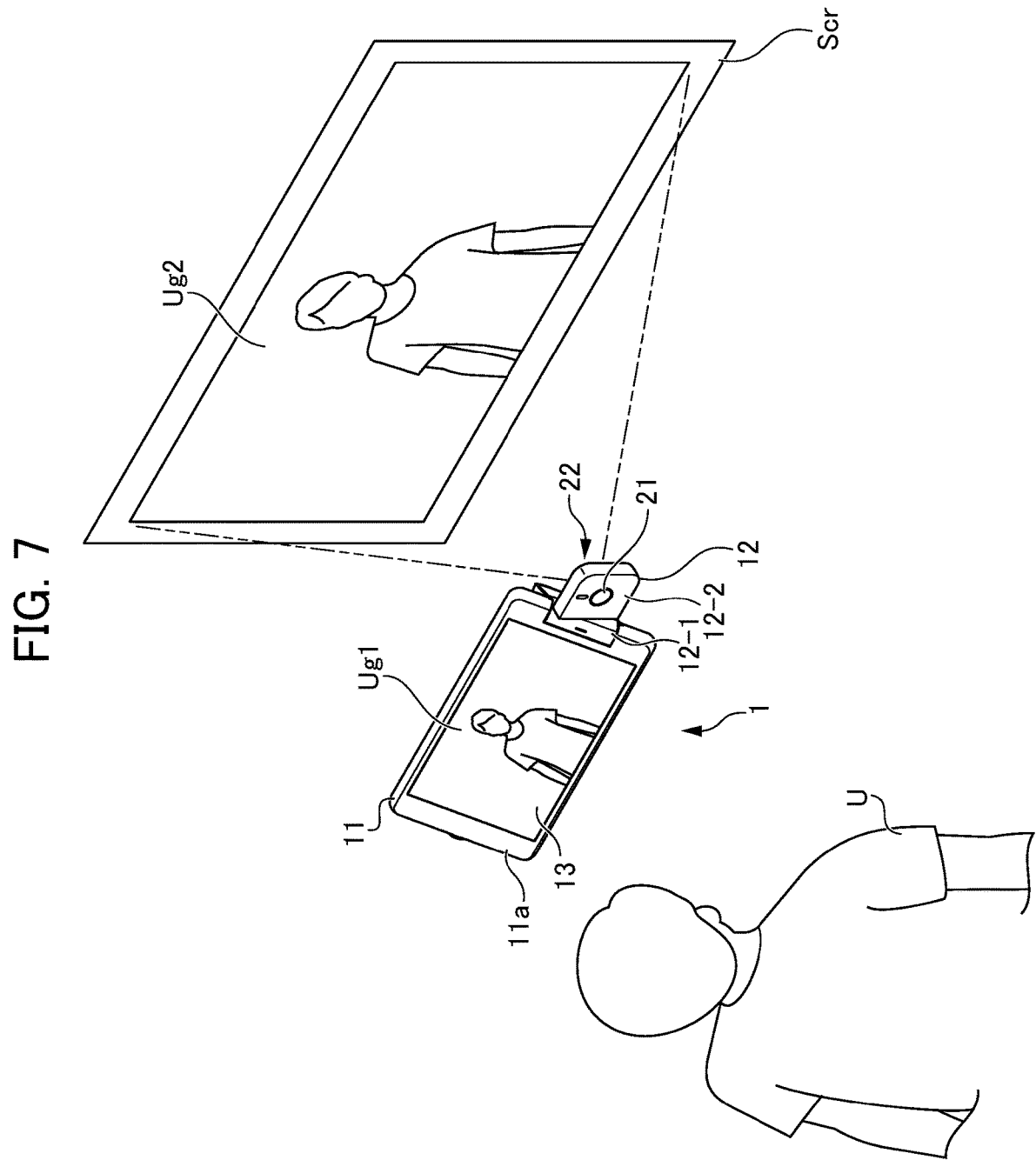

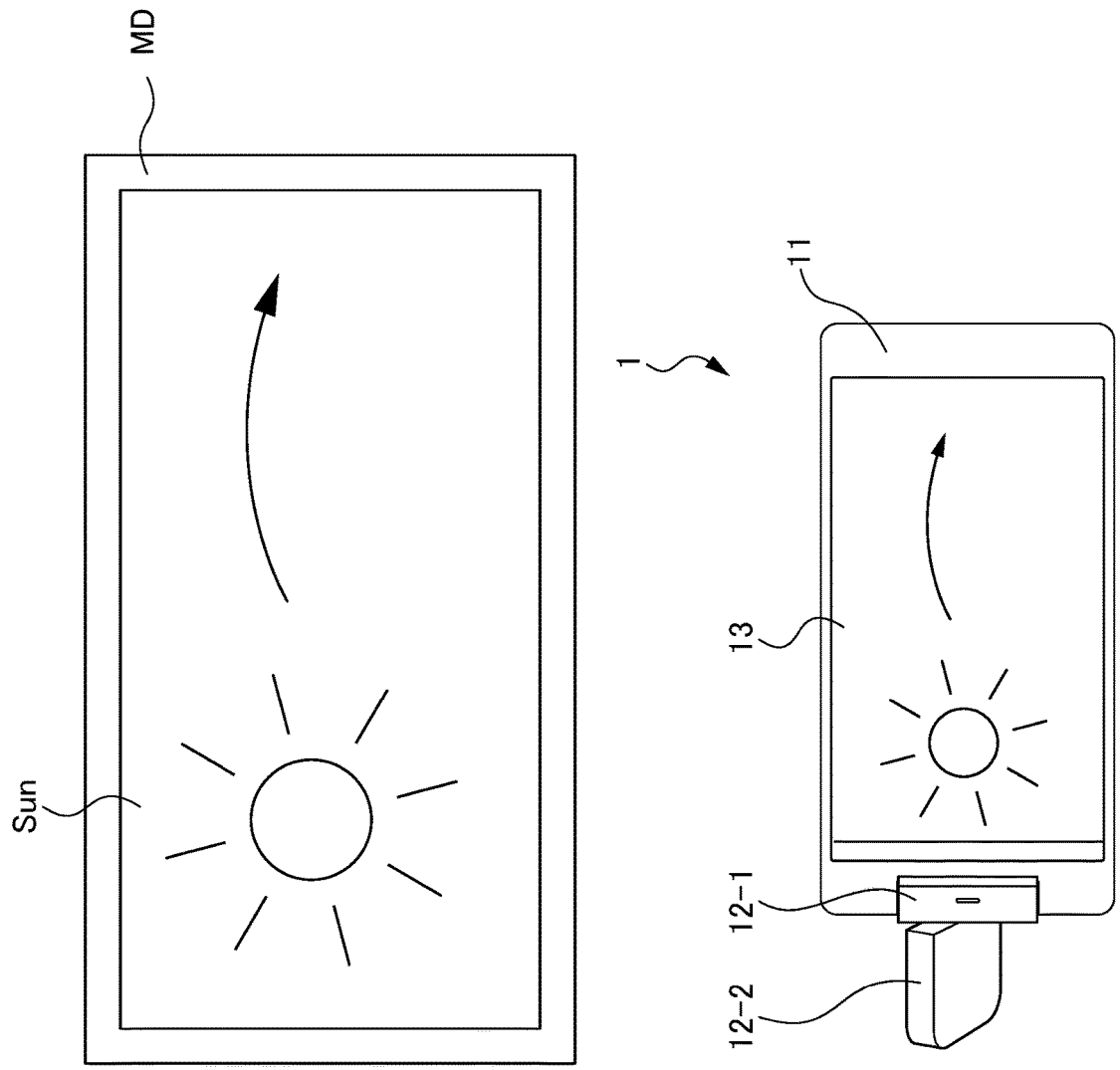

OBJECT ONLY

BACKGROUND ONLY

OBJECT + BACKGROUND

OBJECT + BLURRED BACKGROUND

OBJECT ONLY

BLURRED BACKGROUND

IMAGE CAPTURE WITH MATCHING COMPOSITION

PREVIOUS PHOTOGRAPH

FIG. 16
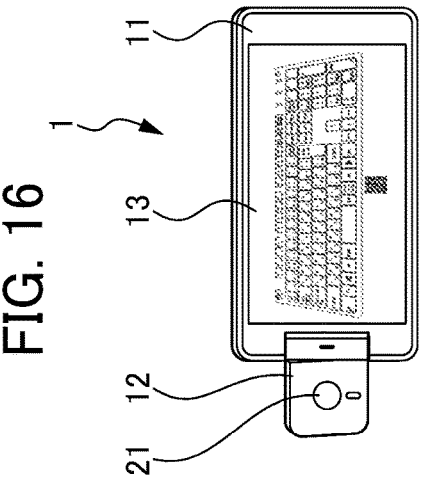
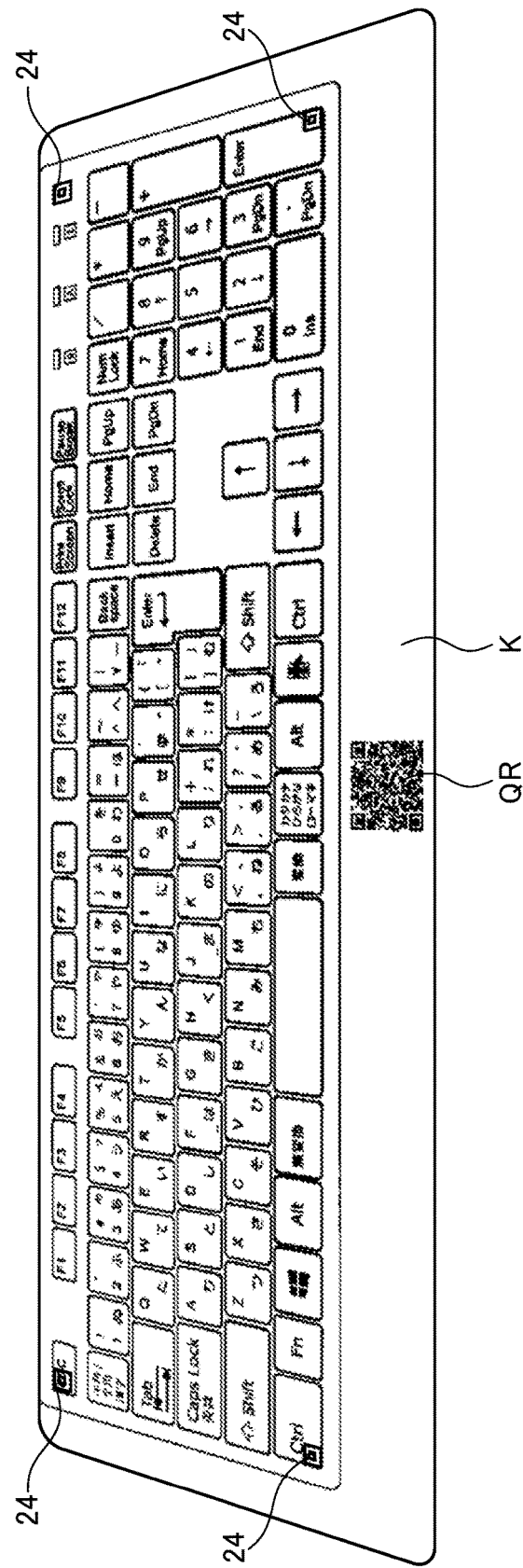

FIG. 18
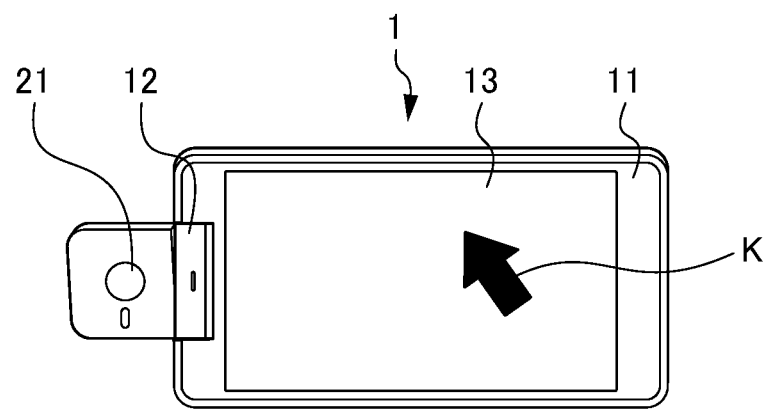
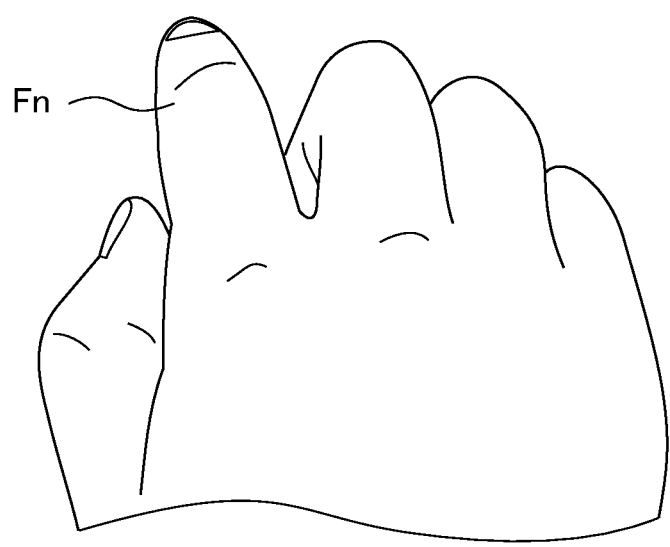

CURRENT CAMERA IMAGE

PREVIOUS PHOTOGRAPH

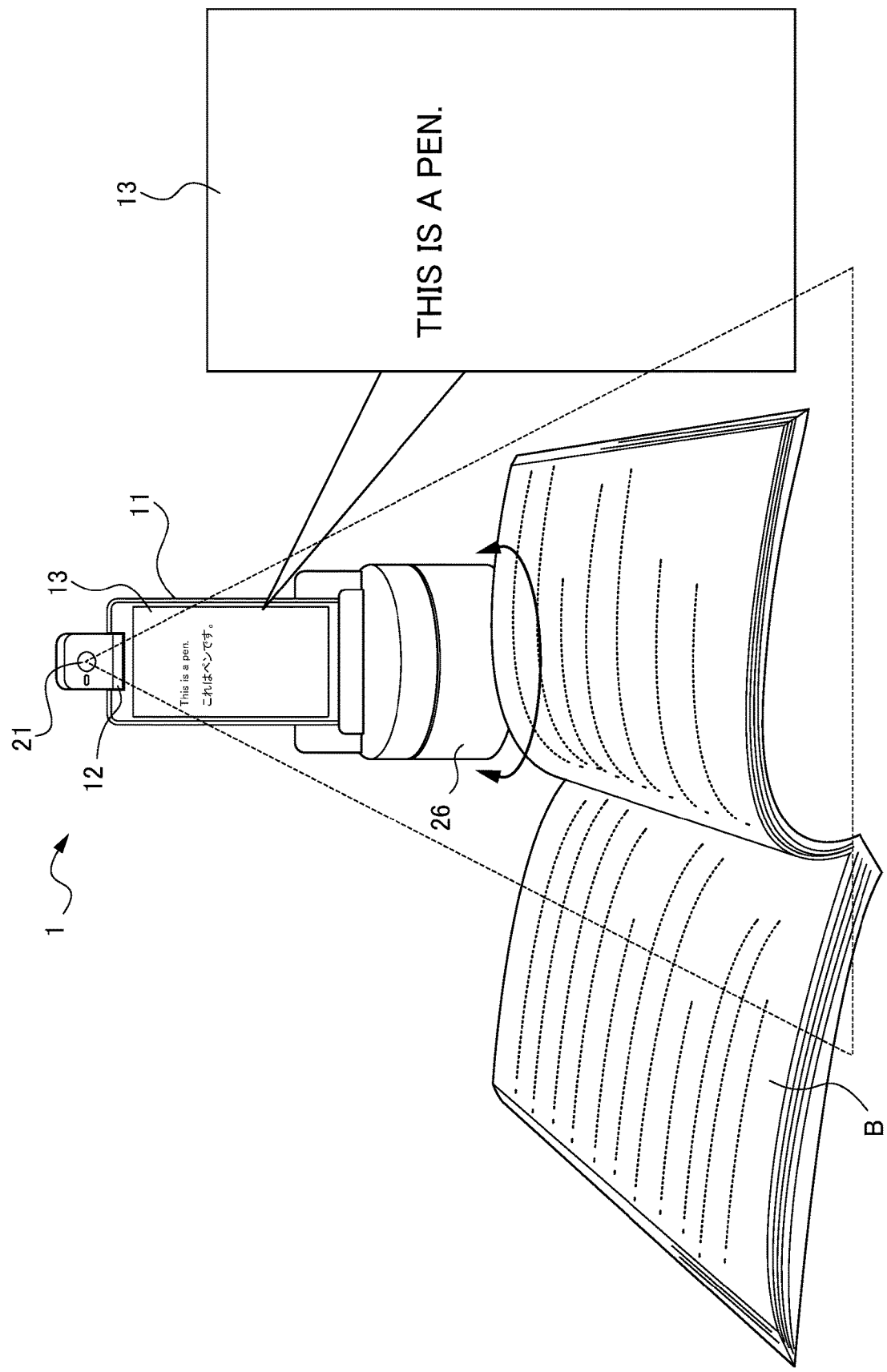

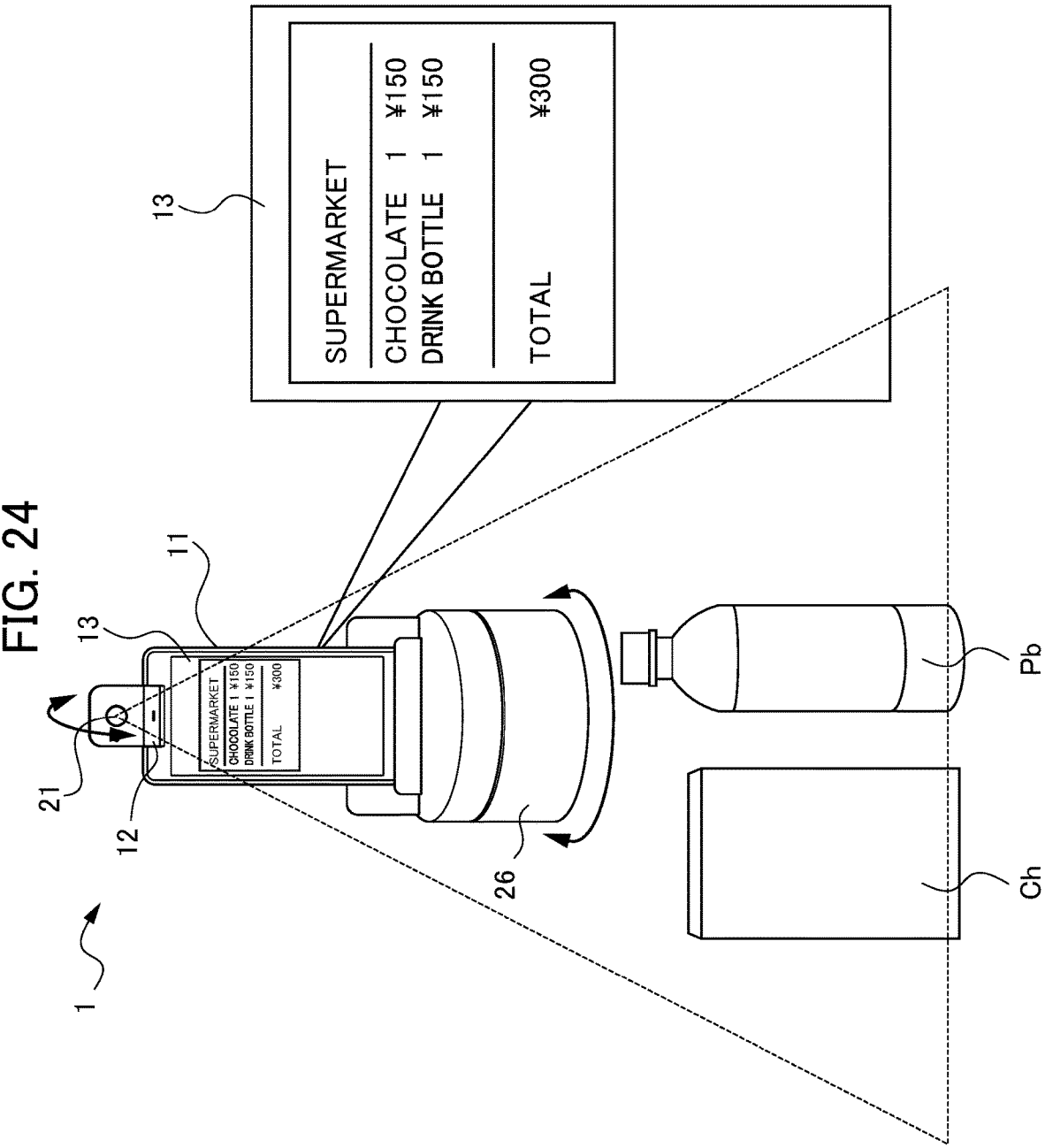

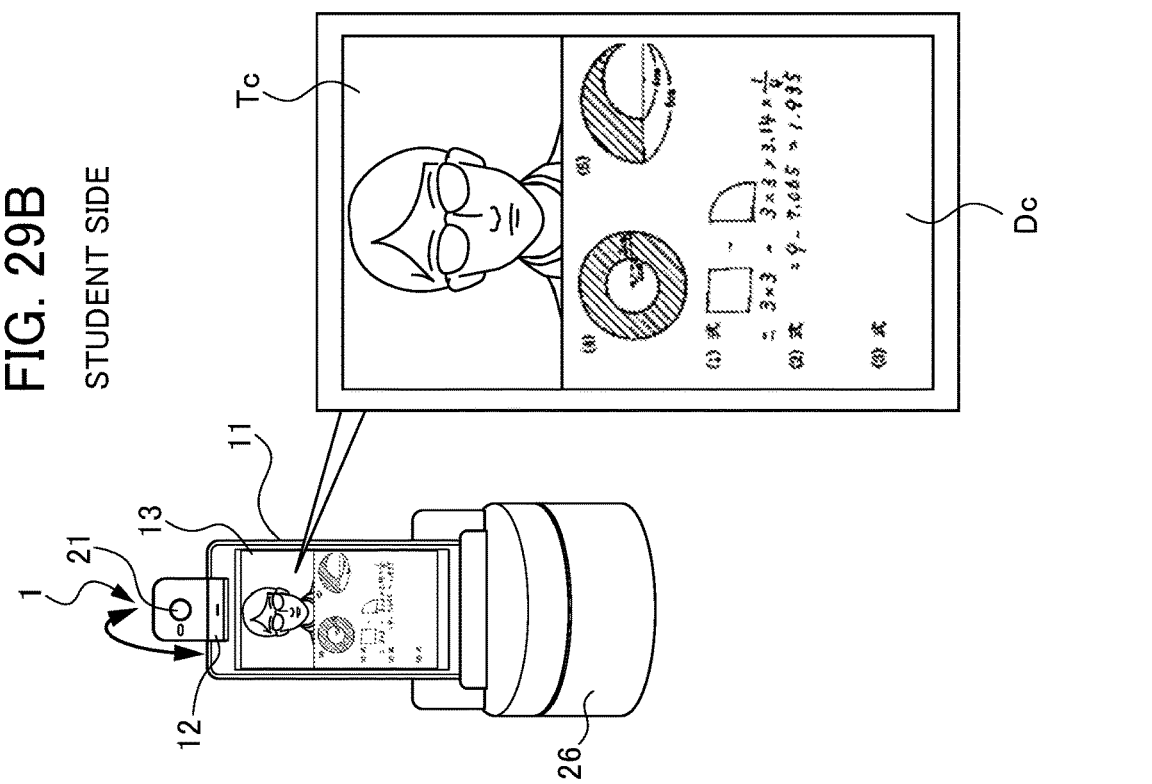
FIG. 29B STUDENT SIDE
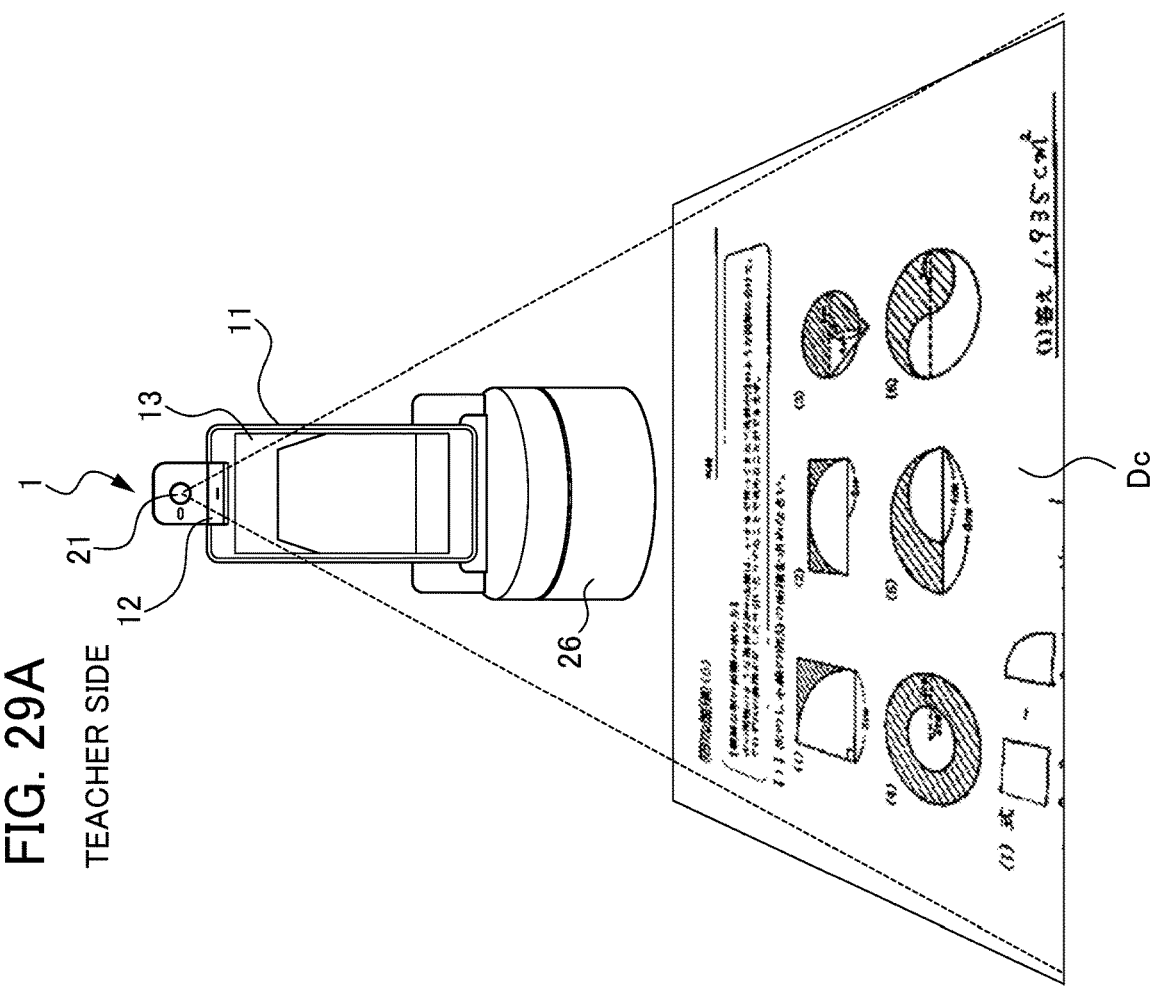
FIG. 29A TEACHER SIDE

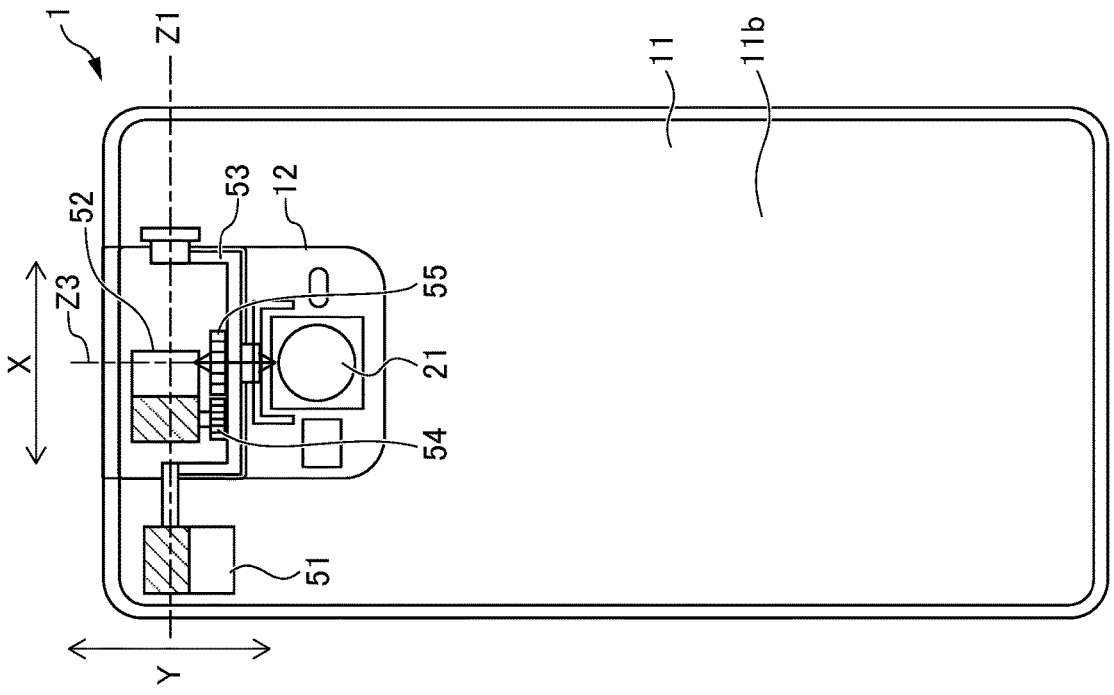
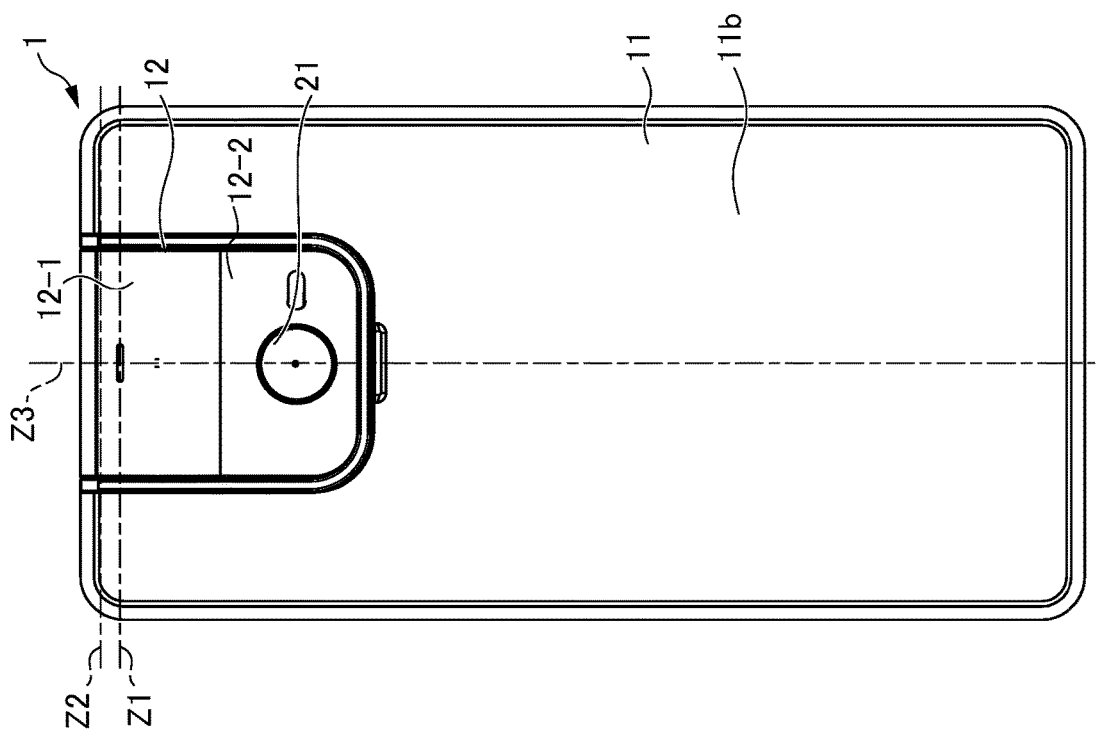

INFORMATION PROCESSING TERMINAL

CROSS-REFERENCE TO RELATED APPLICATIONS

This application is a Divisional of U.S. patent application Ser. No. 16/327,971 filed Apr. 17, 2019, which is the U.S. National Stage of International Application No. PCT/JP2017/031277 filed Aug. 30, 2017, which claims benefit of priority to Japanese Patent Application No. 2016-168212 filed Aug. 30, 2016, the entire content of which is incorporated herein by reference.

TECHNICAL FIELD

The present invention relates to an information processing terminal.

BACKGROUND ART

Heretofore, it has become common for a camera-equipped mobile terminal such as a smartphone or the like to be separately equipped with both a rear camera (a camera for photographing other people), which is directed to a side of the mobile terminal at which a rear surface of a terminal display unit is provided, and a front camera (a camera for self photography), which is directed to a side of the mobile terminal at which a display surface is provided. If two high-performance cameras are employed in this kind of terminal, the terminal is higher in price and the cameras and lenses are larger, which is not preferable in regard to design. In addition, photographing other people is usually the main use of the cameras. Accordingly, the front camera is used as a sub camera, and a small, low-cost, low-performance camera is employed as the front camera.

However, there is demand for performing self photography with a high-performance camera while viewing an image that will actually be captured by the camera on a display unit (below referred to as "the camera viewpoint image"). Accordingly, there are cameras that can be used in both an other-people photography mode and a self photography mode. For example, Patent Document 1 discloses a technology in which an image sensor unit is rotated by a moving mechanism in accordance with selection of a photography mode, and a filter and lens to be used are automatically switched in accordance with the rotation.

Patent Document 1: Japanese Unexamined Patent Application, Publication No. 2008-131555

DISCLOSURE OF THE INVENTION

Problems to be Solved by the Invention

However, in conventional technologies such as Patent Document 1, imaging directions are very limited. Therefore, in functional terms disregarding the issue of cost, similarly to terminals equipped with two or three high-performance cameras, the postures of users at times of image capture are limited.

The present invention has been made in consideration of this situation; an object of the present invention is to provide a mobile information terminal that allows a high-performance camera to be directed in any arbitrary direction relative to a terminal body and that allows photography to be performed in free positions while allowing viewing of a camera viewpoint image.

Means for Solving the Problems

In order to achieve the object described above, an aspect of an information processing terminal of the present invention includes:
an image capture unit that captures an image of a subject;
a body unit, at a predetermined surface of which a display unit is disposed, the display unit displaying a captured image captured by the image capture unit that includes the subject; and
a coupling unit that directly or indirectly couples the image capture unit relatively rotatably to the body unit via a plurality of rotation axes, the plurality of rotation axes including a first rotation axis for changing an angle between an optical axis direction of the image capture unit and a normal direction of the display unit, and a second rotation axis in a direction different from a direction of the first rotation axis, wherein
the body unit includes an accommodation unit that accommodates at least part of the image capture unit by rotating the image capture unit connected to the coupling unit.

The coupling unit may directly or indirectly couple the image capture unit relatively rotatably to the body unit, even in a case in which the information processing terminal may self-supportingly stand by way of a stand that supports the body unit.

The body unit may include the stand.

The coupling unit or the body unit may include a first detection function that detects a predetermined detection target.

The first detection function may include a function that may detect acceleration.

The coupling unit may include the first detection function that may detect a predetermined detection target, the body unit may include a second detection function that may detect a predetermined detection target,
the first detection function may specify a rotation angle around the second rotation axis, and
the second detection function may specify a rotation angle around the first rotation axis.

Effects of the Invention

According to the present invention, a mobile information terminal may be provided that allows photography in free positions while allowing viewing of a camera viewpoint image.

BRIEF DESCRIPTION OF THE DRAWINGS

FIG. 1A, FIG. 1B and FIG. 1C are views depicting exterior structures of an embodiment of an information processing terminal according to the present invention.

FIG. 2A, FIG. 2B and FIG. 2C are views depicting exterior structures of the information processing terminal in FIG. 1A to FIG. 1C.

FIG. 3A, FIG. 3B and FIG. 3C are views depicting states in which a coupling unit of the information processing terminal in FIG. 1A to FIG. 1C is rotated.

FIG. 4A, FIG. 4B and FIG. 4C are views depicting states in which a stand of the information processing terminal in FIG. 1A to FIG. 1C is rotated.

FIG. 6A, FIG. 6B and FIG. 6C are views depicting exterior structures of an embodiment of the information processing terminal according to the present invention, which embodiment is different from FIG. 1A to FIG. 1C, in which a coupling unit is rotated.

FIG. 7 is a view depicting a state in which the information processing terminal in FIG. 6A to FIG. 6C is used standing on a table.

FIG. 10 is a view depicting a state in which the information processing terminal in FIG. 1A to FIG. 1C is used to perform time-lapse photography.

FIG. 16 is a view depicting a state in which a printed keyboard is used to operate the information processing terminal in FIG. 1A to FIG. 1C.

FIG. 18 is a view depicting a state in which the information processing terminal in FIG. 1A to FIG. 1C is operated by finger gestures.

FIG. 23 is a view depicting a state in which the information processing terminal in FIG. 1A to FIG. 1C is used to convert printed matter to text data.

FIG. 24 is a view depicting a state in which the information processing terminal in FIG. 1A to FIG. 1C is used to read products, product barcodes or the like.

FIG. 29A and FIG. 29B are views depicting a state in which the information processing terminal in FIG. 1A to FIG. 1C is used to perform a video chat.

FIG. 32A and FIG. 32B are views depicting exterior and interior structures of an embodiment of the information processing terminal according to the present invention, which structures are different from FIG. 2A to FIG. 2C and the like.

PREFERRED MODE FOR CARRYING OUT THE INVENTION

Figure 5B:
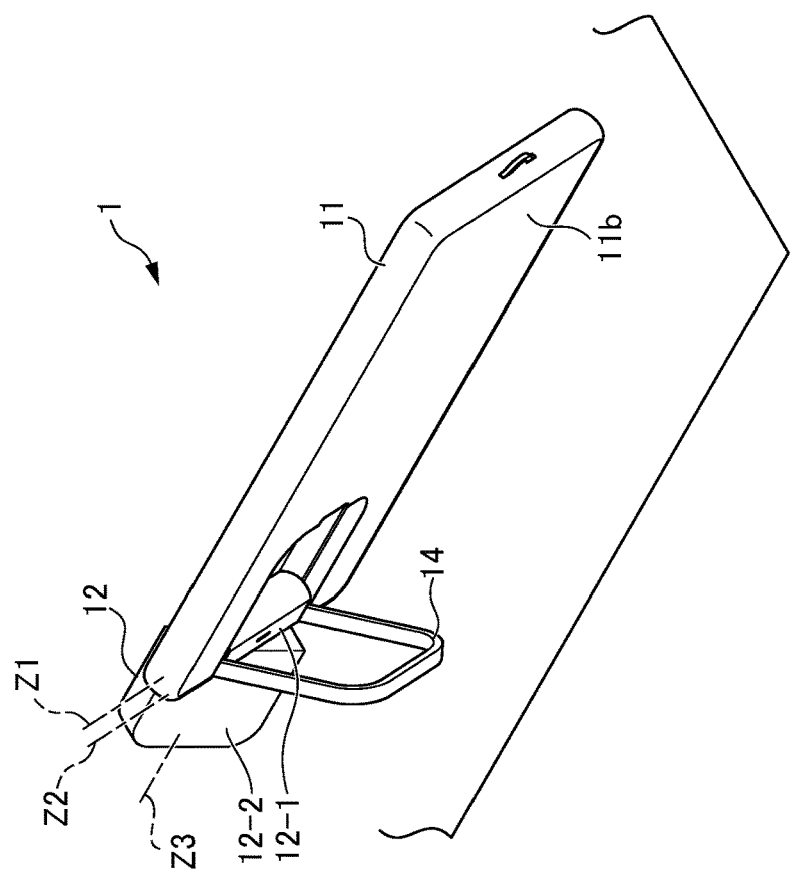
FIG. 5A and FIG. 5B are views depicting a state in which the information processing terminal in FIG. 1A to FIG. 1C is used standing on a table.

In the following, embodiments of the present invention will be explained with reference to the drawings.

FIG. 1A, FIG. 1B and FIG. 1C are views depicting exterior structures of an embodiment of an information processing terminal 1 according to the present invention. FIG. 1A is a front view of the information processing terminal 1. FIG. 1B is a top view of an information processing terminal 1. FIG. 1C is a left side view of the information processing terminal 1. The information processing terminal 1 is equipped with at least display functions and digital camera functions. The information processing terminal 1 is structured with a body unit 11 and a coupling unit 12, which are connected to be rotatable relative to one another.

The body unit 11 is formed in a short column shape with a planar rectangular shape. The body unit 11 is a first casing in which various circuit boards and the like are incorporated. A display unit 13 constituted with a touch panel display or the like is disposed in a predetermined surface 11a (below referred to as the front surface 11a) of the body unit 11.

FIG. 2A, FIG. 2B and FIG. 2C are views depicting exterior structures of the information processing terminal in FIG. 1A to FIG. 1C. FIG. 2A is a rear view of the information processing terminal 1. FIG. 2B is a sectional view along line A-A in FIG. 2A. FIG. 2C is a sectional view in which FIG. 2A is seen from above.

A rear surface 11b of the body unit 11 is a surface at the opposite side of the body unit 11 from the front surface 11a shown in FIG. 1A to FIG. 1C. The coupling unit 12 is formed in a substantially planar rectangular shape, and is rotatably disposed at one of the short sides of the rear surface 11b of the body unit 11. The coupling unit 12 includes a camera base part 12-1 and a camera orientation part 12-2. A circular camera 21 is disposed at a front face of the camera orientation part 12-2 (the face thereof at the side viewed in FIG. 2A). That is, the coupling unit 12 is a second casing in which the camera 21 is incorporated. The camera 21 is an image capture unit that captures images of subjects. Captured images including subjects imaged by the camera 21 are displayed at the display unit 13. As shown in FIG. 2C, a recess width W is a width of a recess for the camera unit. A rotation radius r2 is the longest rotation radius from a pivot axis (center) of a second hinge. Therefore, a relationship between the recess width W and the rotation radius r2 is expressed by the following expression (1).

$$W/2 > r2 \quad (1)$$

The camera base part 12-1 pivot-supports the coupling unit 12 to be wholly rotatable relative to the body unit 11 about a pivot axis Z1. More specifically, the camera base part 12-1 is rotatable about the pivot axis Z1 with end faces of an exterior column shape of the camera base part 12-1 sliding against the body unit 11.

It is preferable in regard to strength if a pivot penetrates through both of end faces of the camera base part 12-1. However, a two-part pivot in which pivots are inserted toward one another through the two end faces is possible, and a cantilever pivot is also possible. The camera orientation part 12-2, at which the camera 21 is mounted, is supported by a cantilever pivot to be rotatable relative to the camera base part 12-1 about a pivot axis Z3, which is arranged substantially orthogonally to the pivot axis Z1.

An arrangement direction of the camera 21 is substantially at 90° relative to the pivot axis Z3. That is, the camera 21 may be moved through solid angles relative to the body unit 11 by rotating independently about the two substantially orthogonal rotation axes, the pivot axis Z1 and the pivot axis Z3.

Thus, the coupling unit 12 is a unit that directly or indirectly couples the camera 21 relatively rotatably to the body unit 11 by plural rotation axes, including the pivot axis Z1 that changes an angle formed by an optical axis direction of the camera 21 and the normal direction of the display unit 13 and the pivot axis Z3 that is in a different direction from the pivot axis Z1 (a direction that is substantially orthogonal thereto in the present example). The coupling unit 12 includes at least one movable part smaller in volume than the body unit 11. In the present example, the camera base part 12-1 and the camera orientation part 12-2 are provided to serve as the movable part. It is sufficient that the camera 21 that is an image capture unit be disposed at a predetermined surface of one of the at least one movable part. In the present example, as described above, the camera 21 is disposed at the front surface of the camera orientation part 12-2. The angle between the direction of the pivot axis Z1 and the direction of the pivot axis Z3 is substantially 90°.

The information processing terminal 1 is further provided with a stand 14 such that the information processing terminal 1 may be disposed standing on a table or the like. The stand 14 is pivot-supported to be rotatable relative to the body unit 11 about a pivot axis Z2. That is, the stand 14 is formed in a frame shape and, when rotated about the pivot axis Z2, self-supportingly stabilizes the information processing terminal 1 on a horizontal surface (see FIG. 5A and FIG. 5B, described below) by forming an arbitrary preferable angle with the body unit 11. The planar shape substantially in a squared "U" shape that is illustrated is an example. It will be clear that a planar substantially rounded "U" shape or the like is possible. If usage on a vertical surface, described below, is anticipated, a planar hook shape or the like is also possible.

Because the stand 14 is formed in the frame shape to encircle the coupling unit 12, efficient use of space may be greatly improved compared to disposing the stand 14 and the coupling unit 12 at respectably separate locations, and an unnecessary increase in size of the casing of the information processing terminal 1 may be avoided. In addition, unnecessary division of internal circuit boards may be avoided. Center lines of both end faces of the coupling unit 12 and the stand 14 substantially coincide with the rotation axes thereof, as illustrated by line A-A.

Below, the pivot axis Z1, pivot axis Z2 and pivot axis Z3 are described. The pivot axis Z1 is the rotation center of the pivot connecting the body unit 11 with the coupling unit 12. A rotation range of the pivot axis Z1 is substantially at least 180° from the rear surface 11b, and is preferably more than 270°.

The pivot axis Z2 is the rotation center of the pivot connecting the body unit 11 with the stand 14. The rotation range of the pivot axis Z2 preferably reaches 180° from the rear surface 11b. In particular, appropriate rotation resistance is provided such that an arbitrary angle up to 90° from the rear surface 11b may be maintained in opposition to a moment of weight of the information processing terminal 1 on a horizontal surface. Consequently, a user may dispose the information processing terminal 1 to be self-supportingly stabilized at a desired angular attitude on a horizontal surface. A portion of the stand 14 may be provided that is offset to the side thereof at which the pivot axis Z2 is provided. Thus, the rotation centers of the pivot axis Z1 and pivot axis Z2 may be made to coincide.

The pivot axis Z3 is the rotation center of the pivot connecting the camera base part 12-1 with the camera orientation part 12-2. The pivot axis Z3 is provided substantially orthogonally to the pivot axis Z1, and rotates in a substantially orthogonal plane about the pivot axis Z1. The rotation range of the pivot axis Z3 preferably reaches 180° to both left and right through the substantially orthogonal plane in which the pivot axis Z3 rotates about the pivot axis Z1.

FIG. 3A to FIG. 3C are views depicting states in which the coupling unit of the information processing terminal in FIG. 1A to FIG. 1C is rotated. FIG. 3A depicts a state in which the coupling unit 12 (more precisely, the camera base part 12-1) of the information processing terminal 1 in FIG. 1A to FIG. 1C has been rotated by 90° about the pivot axis Z1. FIG. 3B depicts a state in which the coupling unit 12 (more precisely, the camera base part 12-1) has been rotated further from the state in FIG. 3A and has been rotated by 180° about the pivot axis Z1. FIG. 3C depicts a state in which the coupling unit 12 (more precisely, the camera orientation part 12-2) has been rotated from the state in FIG. 3B by 90° about the pivot axis Z3. As illustrated in FIG. 3A to FIG. 3C, a distance h1 is the furthest distance from the rotation axis (center) of a first hinge to an upper side surface of the body unit 11 of the information processing terminal 1 (smartphone), a top surface of the information processing terminal 1 (the surface at which the display unit 13 is located) or a bottom surface of the information processing terminal 1 (a surface at which the display unit 13 is not located). A distance h2 is the distance from the rotation axis (center) of the first hinge to a rotational cross-section of a second hinge. The relationship between distance h1 and distance h2 is expressed by the following expression (2).

FIG. 4A to FIG. 4C are views depicting states in which the stand 14 of the information processing terminal 1 is rotated. FIG. 4A depicts the same state as FIG. 3B described above, in which the stand 14 has not been rotated and is stowed in the body unit 11. FIG. 4B depicts a state in which the stand 14 has been rotated about the pivot axis Z2 from the state in FIG. 4A, the stand 14 having been rotated by 180° about the pivot axis Z2. As with FIG. 3A to FIG. 3C, the relationship between distance h1 and distance h2 is the same relationship as in expression (2).

$$h2 > h1 \quad (2)$$

As illustrated in FIG. 4C, the information processing terminal 1 may be attached to a wall KB by the stand 14 being put into the state that is turned 180° about the pivot axis Z2 as illustrated in FIG. 4B, and a user hanging the stand 14 on a clip CL or the like at the wall KB. In the state in FIG. 4C, the optical axis direction of the camera 21 (a subject imaging direction) and the normal direction of the display unit 13 (a direction in which the user views the display unit 13) are normal directions to the surface of the wall KB. Therefore, when posed to face the wall KB, a user may easily capture a photograph with themselves as a subject, known as a selfie shot, while viewing the camera viewpoint image (an image showing themself).

As described above, the stand 14 is rotated relative to the body unit 11 by the pivot axis Z2, and the camera 21 (the coupling unit 12) is rotated relative to the display unit 13 (the body unit 11) by two axes, the pivot axis Z1 and the pivot axis Z3. Therefore, when a user is taking a selfie shot or the like, the information processing terminal 1 may be hung on the wall KB and used as illustrated in FIG. 4C, or the information processing terminal 1 may be stood on a table and used as illustrated in FIG. 5A and FIG. 5B.

Figure 5A:
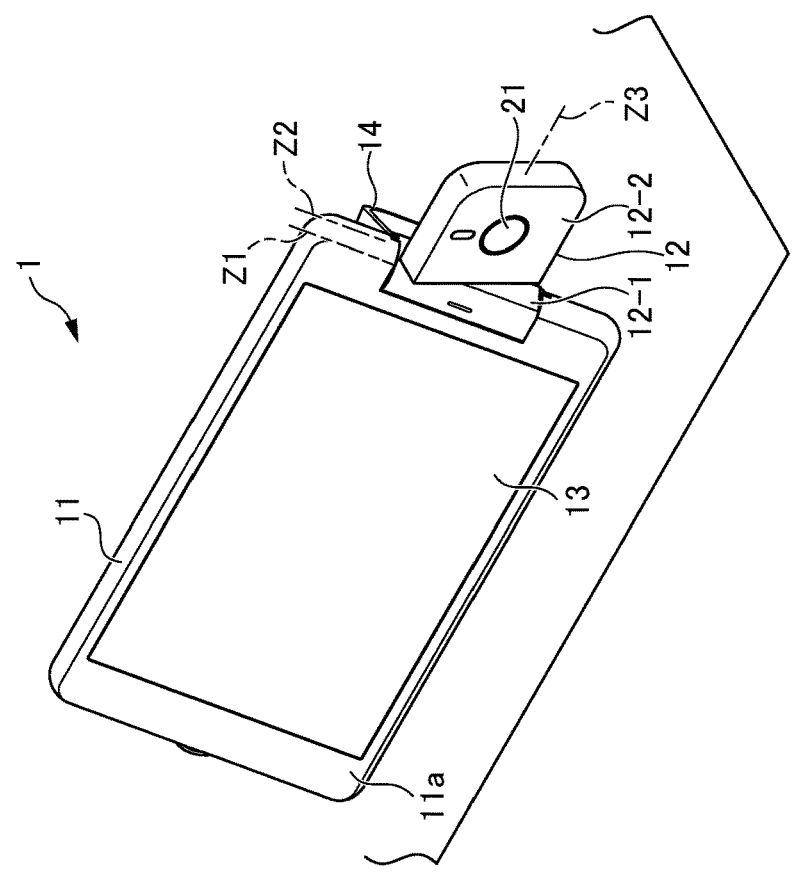

FIG. 5A and FIG. 5B are views depicting a state in which the information processing terminal 1 in FIG. 1A to FIG. 1C is used standing on a table. FIG. 5A is a perspective view from a viewpoint viewing the front surface 11a side of the information processing terminal 1 at which the display unit 13 is disposed. FIG. 5B is a perspective view showing the state of use of the information processing terminal 1 of FIG. 1A to FIG. 1C on the table, viewing the rear surface 11b side at which the display unit 13 is not disposed. In this state, the stand 14 according to the embodiment is rotated by not more than 90° about the pivot axis Z2 from the state in FIG. 4A.

Appropriate rotation resistance is provided to the pivot axis Z2 such that an arbitrary angle up to 90° from the rear surface 11b may be maintained in opposition to the moment of weight of the information processing terminal 1 on a horizontal surface. Consequently, a user may dispose the information processing terminal 1 to be self-supportingly stabilized at a desired angular attitude on the horizontal surface.

When a user is capturing an image of themself or the like with the information processing terminal 1 in FIG. 1A to FIG. 1C, the user stands the information processing terminal 1 on a table or the like in a state that is modified such that the body unit 11 and the stand 14 are opened up by a predetermined angle, as illustrated in FIG. 5A and FIG. 5B. In this state, the camera 21 of the information processing terminal 1 may be directed at the subject by rotation of the pivot axis Z1 and the pivot axis Z3.

By use of a shutter remote control function, a self-timer function or the like, the information processing terminal 1 may capture images without the body unit 11 having to be held in a hand. Thus, the information processing terminal 1 may solve various problems, which are described later.

When the information processing terminal 1 to which the present invention described above is applied is employed, various effects as described below may be provided.

Selfie shots using the front camera of a conventional smartphone have become popular worldwide, particularly in Asia. However, a conventional smartphone has the problems described below. Effects that may solve these problems may be provided by use of the information processing terminal 1 in which the present invention is applied.

For example, a user using a conventional smartphone may take a photograph of themself from a distance not more than the length of their arm by pressing a shutter button with their hand. Thus, there is a limit on the angle of view. Therefore, not all of people the user wishes to photograph together with themself (family, partner, friends or the like) may be in the angle of view, and it may not be possible to take a photograph of the whole of the user's body. As a conventional method to solve this problem, a method of using a selfie stick is available. With this method, the user may take a photograph from a distance that is more than the length of their arm. However, photography from a distance that is further by more than the length of the selfie stick is not possible. Moreover, it may be necessary to walk while holding the selfie stick, and there are places in which the use of selfie sticks is prohibited with a view to safety (theme parks, sports facilities, concert halls, station platforms and so forth). Thus, selfie sticks are not a solution for all situations. Thus, there is a desire to capture images without using a selfie stick. A solution to this problem is to use the information processing terminal 1 in which the present invention is applied. That is, because the information processing terminal 1 in which the present invention is applied includes the stand 14, the information processing terminal 1 may be set on a wall, a table or the like as illustrated in FIG. 4A to FIG. 5B and the like, and a selfie stick is unnecessary.

If a photograph can only be captured by the user extending an arm and pressing a shutter button with their arm extended, the user is in an unnatural pose. When a selfie stick is used, this unnaturalness may be slightly moderated but there is still some unnaturalness, and the user may not be able to adopt a pose they want to capture (for example, a pose employing both arms or the like).

Thus, there is a desire to capture images without using a selfie stick. A solution to this problem is to use the information processing terminal 1 in which the present invention is applied. That is, when the information processing terminal 1 in which the present invention is applied includes the stand 14, a self-timer and a shutter remote control function, the information processing terminal 1 may be set on a wall, a table or the like as illustrated in FIG. 4A to FIG. 5B and the like, and a selfie stick is unnecessary.

Taking a selfie with a larger number of people is a group photograph rather than a selfie. If the user uses their own hand, even with a selfie stick, not everyone may be captured within the frame of the camera. In such cases, one person in the group may move out of the place and act as a photographer, but then the photographer cannot be in the group photograph. In a restaurant before a party or the like, a member of staff can often be asked to take a group photograph. However, having to make this request to a member of staff is troublesome.

Thus, there is a desire to include all image subjects in a photograph without inconveniencing a person other than the image subjects. A solution to this problem is to use the information processing terminal 1 in which the present invention is applied. That is, because the information processing terminal 1 in which the present invention is applied includes the stand 14 and the biaxial rotation mechanism of the camera, the information processing terminal 1 may be set on a wall, a table or the like as illustrated in FIG. 4A to FIG. 5B and the like, and the hand of a person other than the image subjects is not needed.

When a user wants to capture themself using the camera of a smartphone while viewing themself in, for example, a sporting form, image capture is not possible unless the smartphone is set on the ground, a table or the like. Thus, imaging with a smartphone is often abandoned.

Similarly, when a smartphone is to be placed on a table or the like and a selfie shot is to be taken, if the smartphone is placed with the front camera directed at the subject, the placing is not stable or it takes time to place the smartphone.

Figure 9A:
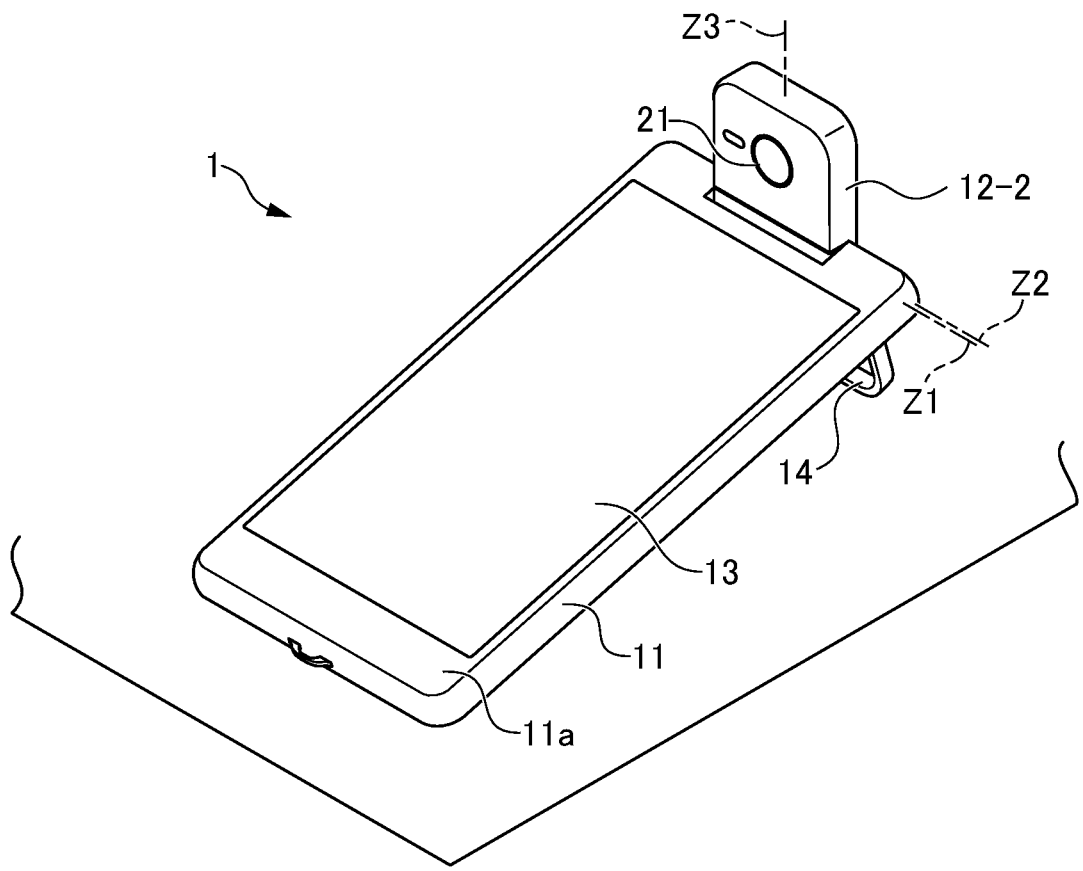
FIG. 9A and FIG. 9B are views depicting a state which the information processing terminal in FIG. 1A to FIG. 1C is used standing on a table.
Figure 9B:
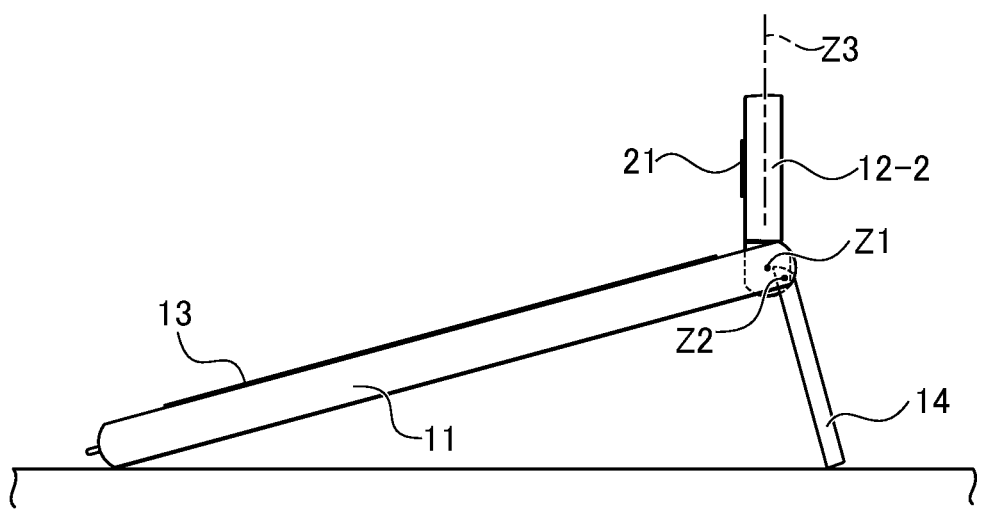

Thus, there is a desire to capture images without using a tripod. A solution to this problem is to use the information processing terminal 1 in which the present invention is applied. That is, because the information processing terminal 1 in which the present invention is applied includes the stand 14 and the biaxial rotation mechanism of the camera, the information processing terminal 1 may be set on a wall, a table or the like as illustrated in FIG. 4A to FIG. 5B and the like, and a tripod is unnecessary. Further, when a portrait orientation image is to be captured, the stand 14 may be erected and the coupling unit 12 rotated by 180° or more, as illustrated in FIG. 9A and FIG. 9B. Thus, an image may be captured in a state in which the information processing terminal 1 is set on a table, and a tripod is unnecessary. In such cases, the stand 14 does not necessarily have to be erected.

When using a smartphone for a video chat, a person often has to hold the smartphone for the whole duration of the chat in order to show their face to the front camera of the smartphone.

In a survey, 80% of respondents say that they hold smartphones in their hands while chatting and that, depending on the duration of the chat, their arms get tired.

Thus, there is a desire to conduct video chats without holding smartphones in hand. A solution to this problem is to use the information processing terminal 1 in which the present invention is applied. That is, because the information processing terminal 1 in which the present invention is applied includes the stand 14 and the rotation mechanism of the camera, the information processing terminal 1 may be set on a wall, a table or the like as illustrated in FIG. 4A to FIG. 5B and the like, and there is no need to hold the smartphone by hand. Further, when a portrait orientation image of a user's face is to be captured and a video chat conducted, the stand 14 may be erected and the coupling unit 12 rotated by 180° or more, as illustrated in FIG. 9A and FIG. 9B. Thus, images may be captured in a state in which the information processing terminal 1 is set on a table, and the smartphone need not be held by hand. In such cases, the stand 14 does not necessarily have to be erected.

As a further solution to these problems, there is a method of equipping a smartphone with a stand for placing the smartphone on a table or the like. However, the angle between a display surface and a front camera is fixed by the stand. Therefore, the camera is not necessarily directed at a subject, and this is not a solution for all purposes in capturing photographs and video images.

Thus, there is a desire to capture images without using a front camera whose angle is fixed. A solution to this problem is to use the information processing terminal 1 in which the present invention is applied. That is, because the information processing terminal 1 in which the present invention is applied includes the stand 14 and the biaxial rotation mechanism of the camera, the rear camera may be brought round to the front face by biaxial rotation as illustrated in FIG. 4A to FIG. 5B and the like and oriented to an arbitrary angle. Thus, a front camera with a fixed angle is unnecessary. Further, when a portrait orientation image is to be captured, the stand 14 may be erected and the coupling unit 12 rotated by 180° or more, as illustrated in FIG. 9A and FIG. 9B. Thus, an image may be captured in a state in which the information processing terminal 1 is set on a table, and a front camera with a fixed angle is unnecessary. In such cases, the stand 14 does not necessarily have to be erected.

Even when a smartphone is equipped with a stand, if there is no place to put the smartphone and there is only a wall, it may not be possible to place the smartphone. As a solution to this problem, there is a method of hanging an information processing terminal on a wall and fixing the information processing terminal. However, it is necessary to prepare a hook for the smartphone, in addition to which space for the smartphone body is required.

Thus, there is a desire to avoid providing separate hooks. A solution to this problem is to use the information processing terminal 1 in which the present invention is applied. That is, when the information processing terminal 1 in which the present invention is applied is put into a state in which the coupling unit 12 and the stand 14 are rotated by 180°, a gap provided between the stand 14 and the coupling unit 12 may be utilized and the information processing terminal 1 may be suspended from a protruding member, pin-shaped member or the like on a flat surface. Thus, the information processing terminal 1 may be excellently employed hanging from a wall, and there is no need to provide a separate hook.

In general, compared to a rear camera, a front camera has:
(a) lower resolution;
(b) lower sensitivity (dark scenes cannot be captured without flash);
(c) fixed focus and no autofocus;
(d) with autofocus, a slow autofocusing speed;
(e) low zoom ratio; and
(f) no flash. Thus, there are many weaknesses in performance and images may not be captured with excellent image quality. In addition, when there are differences in performance between a rear camera and a front camera, it is necessary to develop two cameras for the same model of image processing terminal. As a solution to this problem, apps for taking selfie shots with a rear camera are available. However, because the display unit cannot be seen, control is conducted by voice or the like and usability is very poor.

Thus, there is a desire to avoid using application programs for taking selfie shots without viewing the display unit. A solution to this problem is to use the information processing terminal 1 in which the present invention is applied. That is, because the information processing terminal 1 in which the present invention is applied allows the camera 21 that is a high-performance camera to be directed in any arbitrary direction relative to the terminal body and allows photographing to be performed in a free position while allowing for the viewing of the camera viewpoint image, application software for taking selfies without viewing the display unit 13 is unnecessary.

A stand and a rotating camera are another solution, but respective pivots for rotation are required at the camera body, space must be reserved for these two pivots, and the casing of the body is larger. Moreover, depending on how the camera can be rotated, the camera is often not directed at a subject even when the camera of the standing smartphone has been rotated. Thus, this solution is often not applicable. The number of rotation axes may be increased to allow the camera to be directed at subjects. However, always having to direct the camera at a subject before imaging when capturing photographs may be troublesome in many cases.

Thus, there is a desire to always direct a camera at subjects with a small number of rotation axes. A solution to this problem is to use the information processing terminal 1 in which the present invention is applied. That is, with the information processing terminal 1 in which the present invention is applied, because the pivot axes of both the stand 14 and the camera 21 may be utilized, the camera 21 may always be directed at subjects just by biaxial rotation as illustrated in FIG. 4A to FIG. 5B and the like. Thus, there is no need to increase the number of rotation axes.

In a conventional information processing terminal in which a rear camera and a front display unit are fixed at the body, because the direction of the camera and the direction of the display unit are opposed, it is difficult to view the display unit while capturing high angle shots, in which images are captured from positions higher than the eyes, and low angle shots, in which images are captured from positions lower than the waist. For example, when taking a photograph of a subject surrounded by a crowd, a high angle shot must be taken from above the crowd, but when the camera is directed at the subject, the display unit is directed upward and the camera viewpoint image may not be viewed during image capture.

Similarly, when the camera is directed at a subject at a position higher than the camera from a position lower than the user's waist, the display unit is directed downward and the camera viewpoint image may not be viewed during image capture. As a solution to this problem, the camera may be rotated to set the direction of the camera and the direction of the display unit separately. Hence, the camera viewpoint image may be viewed during image capture.

When the camera is rotated in this situation, the vertical orientation of the image may change and, if no particular measures are taken, the vertical orientation may be upside down or the like. If a direction in which the camera is rotated for high angle shots and low angle shots is fixed (the camera only rotates in the clockwise direction from a regular position, or the like), capturing images is more difficult. Therefore, it is preferable if the camera is rotatable in both directions.

Thus, there is a desire to capture images without using a rear camera whose angle is fixed. A solution to this problem is to use the information processing terminal 1 in which the present invention is applied. That is, because the information processing terminal 1 in which the present invention is applied includes the stand 14 and the biaxial rotation mechanism of the camera 21, the camera 21 may be oriented in any arbitrary direction up or down to the rear by biaxial rotation as illustrated in FIG. 4A to FIG. 5B and the like, and a rear camera with a fixed angle is unnecessary. It is preferable if an angle of view to be imaged (a wide view, a usual view, a narrow view or the like) can be automatically switched at a certain time when the camera 21 is being rotated. In general, the optical axis direction at a side at which a front camera is disposed is used more often for short distances to subjects. Therefore, this side is to be used for wide-angle photography, and the optical axis direction at a side at which a rear camera is disposed is to be used for usual or narrow-angle photography. Accordingly, it is preferable if the angle of view is automatically changed in accordance with the direction of the camera.

When taking a selfie shot, a shutter button, touch panel or the like must be pressed to release the shutter. Thus, it may not be possible to hold a smartphone firmly, and the smartphone may become unstable and be dropped. As a solution to this problem, the shutter is released by timer-setting, gesture recognition, voice recognition or the like. However, it may be difficult to recognize a timing at which the shutter is released, response may be slow, and usage is difficult when trying to capture a moment in which, as an example, five people are jumping.

Thus, there is a desire to capture images without taking a hand from the smartphone to press a shutter button. A solution to this problem is to use the information processing terminal 1 in which the present invention is applied. That is, because the information processing terminal 1 in which the present invention is applied includes a shutter remote control support function, when a selfie shot is to be taken as illustrated in FIG. 4A to FIG. 5B and the like, the shutter can be released without a press of a shutter button, touch panel or the like, and there is no need to hold the smartphone firmly.

Even with the shutter remote control support function, when, for example, ten people are to be imaged in a group shot, the information processing terminal 1 is placed on a table or the like, the camera 21 is rotated to be directed at the ten people, and the user moves away from the information processing terminal 1. Hence, the display unit 13 appears small. Because it may be hard to see whether all the people are within the frame of the camera viewpoint image, their individual expressions cannot be seen and the like, it may be difficult to operate the shutter. Thus, there is a desire to capture images while viewing the camera viewpoint image by some method. A solution to this problem is to use the following technique. That is, a technique may be employed of equipping the information processing terminal 1 in which the present invention is applied with an image sharing function that enables transmission and control of the camera viewpoint image, by wire or wireless, to another information processing terminal such as a smartphone, a personal computer or the like. Thus, the camera viewpoint image of the information processing terminal 1 may be shared with another information processing terminal, and a still image or video image may be captured from a position separated from information processing terminal 1. The information processing terminals may be directly connected to one another or, using an Internet circuit, the camera viewpoint image of the information processing terminal 1 located in a home may be shared with a personal computer in an office. Thus, an image of a pet left at home may be captured while viewing the image on the personal computer.

With a conventional digital camera, smartphone or the like, a composite panorama shot may be captured by moving the camera laterally. However, this image must be captured while the smartphone, camera or the like is being laterally moved to be directed in various directions, and it is often not possible to composite the image neatly.

Thus, there is a desire to image surroundings with a camera without laterally moving the body of the camera. A solution to this problem is to use the information processing terminal 1 in which the present invention is applied. That is, in the information processing terminal 1 in which the present invention is applied, rotation of the camera 21 about the pivot axes Z1 and pivot axis Z3 may be electrified. Hence, the camera 21 may be panned as illustrated in FIG. 3A to FIG. 3C while the body stays still, and there is no need to laterally move the camera 21.

Heretofore, there have been attempts to utilize personal gestures to control equipment and video games. However, it is important for a camera to always be directed at the subject to recognize gestures. Consequently, a camera terminal and a game terminal must be provided separately, and this processing cannot be performed by a smartphone alone. In addition, cameras for gesture recognition are very expensive and generate additional costs.

Thus, there is a desire for gesture recognition without using a dedicated gesture recognition camera. A solution to this problem is to use the information processing terminal 1 in which the present invention is applied. That is, in the information processing terminal 1 in which the present invention is applied, the camera 21 directed at a person may perform high-level functions (for example, EXVISION gesture recognition), and a dedicated gesture recognition camera is unnecessary.

Heretofore, navigation software for walkers has been available for smartphones. However, particularly outdoors, it may not be easily understood which direction the user is facing in. Thus, the user may not understand or may require time to understand which direction to walk in. As a solution to this problem, navigation with augmented reality (AR) utilizing a camera is available.

In this navigation, a user interface superimposes arrows on an actual video image captured by the camera. Consequently, the navigation may be used immediately without time being required to verify the direction. However, in order to capture the image with a camera that is fixed at an angle orthogonal to the rear surface of a body unit, the smartphone body must be continuously held perpendicular to the ground. At this angle, the display unit is hard to see and continuous holding is tiring.

Smartphone walking, the behavior of using a smartphone while walking outside, has become a social nuisance. Because a user is concentrating on the screen, the user lacks awareness until they come near to a collision. These two problems may be solved with a rotating camera. During smartphone walking, a video image from the rotated camera 21 may be displayed in a window in the display unit 13, the presence of obstacles may be reported by sounds, images, vibrations and the like, and hazards may be avoided.

In the embodiment, when the camera is rotated to a vertical direction relative to the display screen, the above two problems may be solved. However, when the direction of the camera rotates smoothly, the camera may move loosely and be unstable.

Thus, there is a desire to avoid free movement and instability of the camera when the body is being held stable. A solution to this problem is to use the information processing terminal 1 in which the present invention is applied. That is, in the information processing terminal 1 in which the present invention is applied, rotation of the camera 21 may be locked at a particular angle and, provided the body unit 11 is held stable, the camera 21 is stable.

In recent years, driving recorders mounted in cars, bicycles and the like have spread rapidly. The purpose of driving recorders is to, in the event of an accident, provide objective evidence about the accident by recording image data, global positioning system (GPS) data and the like. A smartphone may be used in place of a driving recorder by installing an application on the smartphone, but this has not become widespread. In a car, a holder is used that fixes a smartphone or the like on the car's dashboard with a sucker, two-sided tape or the like, and the smartphone is secured such that the display unit is easy for a driver to see. In this case, the optical axis direction of the camera of the smartphone is not directed to the vehicle front or rear, which it would be desirable to image, but only captures the dashboard. That is, when a smartphone is placed at a position that is easy for a driver to see and that does not impede driving, the smartphone cannot perform the function of a driving recorder. If priority is given to image capture as a driving recorder, the smartphone must be placed at a position that is more difficult for the driver to see. Therefore, it is not possible to use a smartphone for multiple purposes such as using the smartphone as both a driving recorder and a navigation system or the like. The same applies to bicycles.

It may be that the use of smartphones as driving recorders is not widespread for this reason. Thus, there is a desire to use a smartphone as a driving recorder while also using the smartphone for other purposes. A solution to this problem is to use the information processing terminal 1 in which the present invention is applied. That is, in the information processing terminal 1 in which the present invention is applied, the camera 21 may be directed to any arbitrary direction relative to the terminal body, and while a navigation map is being displayed, a portion of the screen may display the camera viewpoint image in a picture-in-picture mode. Thus, the smartphone may be used for other purposes at the same time as being used as a driving recorder. As a result, a dedicated driving recorder is unnecessary. In a car, the information processing terminal 1 is placed in landscape orientation. However, because the camera 21 can be rotated about two axes, the information processing terminal 1 is compatible with a wide range of placing formats, such as placing in portrait orientation on a bicycle and so forth.

In the smartphone industry, it is apparent that the future will bring more cases of multiple sensors being installed in the rear camera and used for range measurement, zooming and the like as well as for capturing photographs. If the same modifications are made to the front camera side, costs will rise greatly. Therefore, it is very likely that there will be functional differences between the front and rear cameras.

Thus, there is a desire to raise the performance only of the rear camera. A solution to this problem is to use the information processing terminal 1 in which the present invention is applied. That is, in the information processing terminal 1 in which the present invention is applied, when deployment of a stereo camera is anticipated and the rotatable camera 21 is provided, the application of an additional function to the front camera is unnecessary.

It should be noted that the present invention is not limited to the embodiment described above, and any modifications and improvements thereto within a scope that can realize the object of the present invention are included in the present invention.

For example, in the embodiment described above, the coupling unit 12 is structured by two movable parts, the camera base part 12-1 and the camera orientation part 12-2, but the above embodiment is not particularly limiting. It is sufficient to include at least one movable part that is smaller in volume than the body unit 11. Herein, it is sufficient for the camera 21 that is the image capture unit to be disposed at a predetermined surface of one of the at least one movable part. Devices with arbitrary functions may be mounted at arbitrary numbers of arbitrary types of the one or more movable parts (including the movable part at which the image capture unit is disposed).

For example, as illustrated in FIG. 6A to FIG. 6C, a projector 22 may be mounted at the camera orientation part 12-2 at which the camera 21 is mounted. FIG. 6A to FIG. 6C depict an embodiment of the information processing terminal of the present invention and show the states of rotating the coupling unit which is different from the coupling unit of embodiment in FIG. 1A to FIG. 1C.

In FIG. 6A, the coupling unit 12 (more precisely, the camera base part 12-1) of the information processing terminal 1 in FIG. 1A to FIG. 1C is in a state that is rotated 180° about the pivot axis Z1. In FIG. 6B, the coupling unit 12 (more precisely, the camera orientation part 12-2) is in a state that is rotated 90° rightward about the pivot axis Z3 (as viewed from the side of the body unit 11 at which the front surface 11a is disposed) from the state in FIG. 6A. As illustrated in FIG. 6B, the circular camera 21 is disposed substantially at the center of the front surface of the camera orientation part 12-2 (the surface at the side seen in FIG. 6B). In FIG. 6C, the coupling unit 12 (more precisely, the camera orientation part 12-2) is in a state that has been rotated 90° leftward about the pivot axis Z3 (as viewed from the side of the body unit 11 at which the front surface 11a is disposed) from the state in FIG. 6A. As illustrated in FIG. 6C, the circular projector 22 is disposed substantially at the center of the rear surface of the camera orientation part 12-2 (the surface at the side seen in FIG. 6C, which is the surface opposing the front surface). As with FIG. 3A to FIG. 3C, the relationship between the distance h1 and the distance h2 is the same relationship as in expression (2).

In the information processing terminal 1 according to the embodiment in FIG. 6A to 6C, the stand 14 is rotated relative to the body unit 11 by the pivot axis Z2, and the camera 21 (the coupling unit 12) is rotated relative to the display unit 13 (the body unit 11) by the two axes, the pivot axis Z1 and the pivot axis Z3. Therefore, when a user is capturing a selfie shot or the like, the information processing terminal 1 may be stood on a table and used as illustrated in FIG. 7.

FIG. 7 is a view depicting a state in which the information processing terminal 1 in FIG. 6A to FIG. 6C is used standing on a table. The camera 21 is imaging a user U. The image captured by the camera 21, which is to say a camera viewpoint image containing an image Ug1 of the user U, is displayed at the display unit 13. As illustrated in FIG. 7, the projector 22 is disposed at the camera orientation part 12-2, in the rear surface that opposes the front surface in which the camera 21 is disposed. Accordingly, the projector 22 may project the image captured by the camera 21, which is to say the camera viewpoint image containing an image Ug2 of the user U, onto a screen Scr. As a result, the camera viewpoint image may be viewed by the user U via the display unit 13, and may be viewed by other people, who are not depicted in the drawing, via the screen Scr.

It is not particularly necessary for images displayed at the display unit 13 and images projected onto the screen Scr by the projector 22 to completely match as in the example in FIG. 7; the images may be different. For example, if the information processing terminal 1 is being used as a videophone, the image of the user U (the camera viewpoint image from the camera 21) may be displayed at one of the display unit 13 and the screen Scr and an image of a communication partner may be displayed at the other of the display unit 13 and the screen Scr. As other examples, the camera 21 and the projector 22 need not be disposed at opposing positions of the coupling unit 12, but may be disposed in the same surface, and may be disposed in different surfaces.

Further, in the example in FIG. 6A to FIG. 7, the camera 21 and the projector 22 are mounted at the same movable part (the camera orientation part 12-2). Therefore, either the imaging direction of the camera 21 or the projecting direction of the projector 22 is limited. Accordingly, although not illustrated, a movable part separated from the camera orientation part 12-2 may be provided and the projector 22 may be mounted at this movable part. Hence, the imaging direction of the camera 21 and the projection direction of the projector 22 may be directed to arbitrary directions respectively independently.

Figure 8:
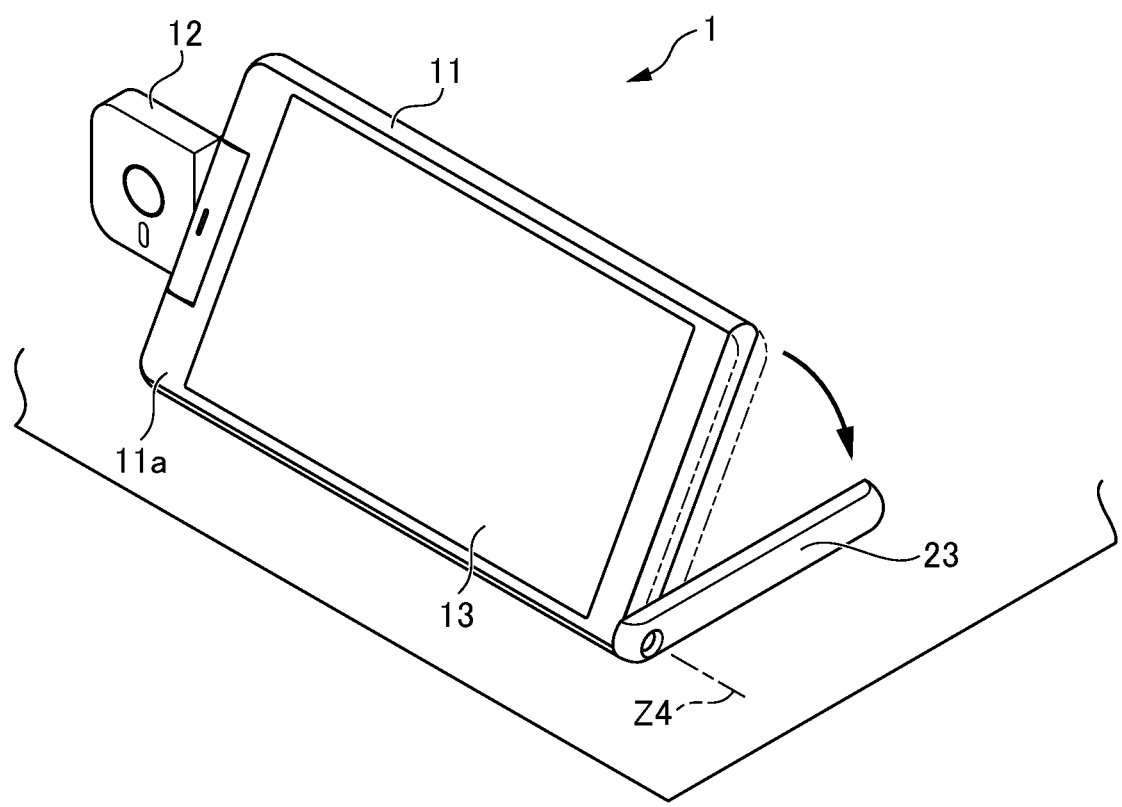
FIG. 8 is a view depicting a state of use, on a table, of an embodiment of the information processing terminal according to the present invention, which embodiment is different from FIG. 1A to FIG. 1C and FIG. 6A to FIG. 6C.

As a further example, in the embodiment described above, the stand 14 is structured so as to rotate about the pivot axis Z2 to positions perpendicular to the length direction of the body unit 11, but this is not particularly limiting. FIG. 8 is a view depicting a state of use, on a table, of an embodiment of the information processing terminal according to the present invention, which embodiment is different from those in FIG. 1A to FIG. 1C and FIG. 6A to FIG. 6C.

In the information processing terminal 1 according to the embodiment in FIG. 8, a stand 23 is rotated approximately 50° about a pivot axis Z4 toward the side thereof at which the rear surface 11b is disposed, the stand 23 is stood on the table, and then the camera 21 is rotated about the pivot axis Z1 and the pivot axis Z3 and put into a state that is directed to allow a selfie shot. The stand 23 has substantially the same exterior dimensions as a short side of the body unit 11. When an opening angle of the stand 23 from the body unit 11 is at 0°, the stand 23 is morphologically integral with the body unit 11, structuring a lower end portion of the information processing terminal 1 as a whole.

The pivot axis Z4 rotatably couples the stand 23 to the body unit 11 at a corner portion of the body unit 11. The axial direction of the pivot axis Z4 is substantially parallel with a long side of the body unit 11. The pivot axis Z4 provides appropriate rotation resistance to keep the information processing terminal 1 stable in opposition to a moment of weight of the information processing terminal 1. Intermediate positions at which rotation of the pivot axis Z4 can be stopped may be provided at plural points up to an opening angle of 90°.

The pivot axis Z4 allows the stand 23 to rotate at least up to 90° toward the side thereof at which the rear surface 11b is disposed. Thus, as described above, the opening angle between the body unit 11 and the stand 23 may be set to 0°. Because the axial direction of the pivot axis Z4 is substantially parallel with the long edge of the body unit 11 as mentioned above, in order to capture a selfie shot, a user stands the information processing terminal 1 on a table as illustrated in FIG. 8 and, when using the information processing terminal 1 in landscape orientation, adjusts the rotation angle of the pivot axis Z4 to match a standing angle of the body unit 11. Thus, adjustment of the angle is easy.

In other words, from a state in which the information processing terminal 1 is laid flat on a table, the body unit 11 side may be lifted up while the stand 23 is kept placed on the table surface, to put the information processing terminal 1 into the usage state in FIG. 8. Hence, by gently pushing the body unit 11 side onto the table surface from this state, a user may put the information processing terminal 1 into a laid flat state with higher stability, without lifting up the information processing terminal 1.

With the stand 23, finer angular adjustment is possible. Therefore, if a subject is higher than the front camera or a uniaxially rotatable camera, the camera may be directed precisely at the subject even without a biaxial camera.

FIG. 9A and FIG. 9B are views depicting a state which the information processing terminal in FIG. 1A to FIG. 1C is used standing on a table. FIG. 9A is a perspective view showing a state in which the information processing terminal is stood on the table in portrait orientation and used. FIG. 9B is a side view showing the state in which the information processing terminal is stood on the table in portrait orientation and used.

In the information processing terminal 1 according to the embodiment in FIG. 9A and FIG. 9B, the stand 14 is rotated less than 90° about the pivot axis Z2 toward the side thereof at which the rear surface 11b is provided, the stand 14 is stood on a table, and then the pivot axis Z1 is rotated to put the information processing terminal 1 into a state in portrait orientation in which the camera 21 is directed to allow a selfie shot. For example, when the information processing terminal 1 is used for a video chat, in order to use the information processing terminal 1 comfortably, a user at a receiving side may switch between portrait orientation and landscape orientation to match a portrait orientation image or landscape orientation image of a communication partner.

If the communication partner's image is in portrait orientation but a selfie may not be captured while the information processing terminal 1 side is upright in portrait orientation, the user at the information processing terminal 1 side must continue to hold the information processing terminal 1 in their hand or force imaging in landscape orientation while the communication partner stays in portrait orientation, or both parties must tolerate images of one another at their display units that are small or cropped. In contrast, with the information processing terminal 1 in FIG. 1A to 1C, because the stand 14 and the rotation mechanism of the image capture unit are provided, even when there is not a suitable wall surface in the vicinity or a fixing piece such as a protrusion, a pin or the like that is capable of supporting the information processing terminal 1 hanging from a wall surface, the information processing terminal 1 may be stood on a table in portrait orientation. As a result, these can solve all the problems such as the burden of keeping the information processing terminal 1 in portrait orientation and camera shaking during handheld imaging.

An application program of the camera 21 may automatically start up when the pivot axis Z1 is rotated and the coupling unit 12 is raised. Accordingly, the application program of the camera 21 is available for unexpected opportunities for photography but need not run at all times. Thus, limited battery power need not be wasted. Further, an "open" button that automatically rotates the pivot axis Z1 may be provided at a location that is easy to operate by pressing, such as a side face of the body unit 11 or the like, and the coupling unit 12 may be raised simply by a press of the button.

Usually, when a time-lapse photograph or video is to be captured, a method is adopted of fixing a camera on a tripod and capturing the images at a certain interval. However, this requires a lot of equipment, such as the tripod. Moreover, there is a desire to capture images with time-lapse image capture while moving the direction of a camera to match, for example, movement of the sun, rather than completely fixing the camera. In this case, additional equipment such as a dolly for moving the camera is required, and this must be set up in addition to the camera.

In contrast, according to an embodiment of the information processing terminal of the present invention as illustrated in FIG. 10, the information processing terminal 1 includes the biaxial rotation mechanism as illustrated in FIG. 4A to FIG. 5B and the like, and is equipped with the stand 14, the camera 21 and the like. Therefore, without using additional fixing equipment such as a tripod or the like, the camera 21 may be fixed and may capture a time-lapse photograph or video image of the sun seen through a window MD.

Further, the information processing terminal 1 depicted in FIG. 10 includes plural rotation axes such as the pivot axes Z1 to Z4 described above. Therefore, without using additional equipment such as a dolly, the information processing terminal 1 may be set up in advance such that the direction of the camera moves to match movement of an object moving at low speed, such as the sun, and may capture a time-lapse photograph or video.

Figure 11A:
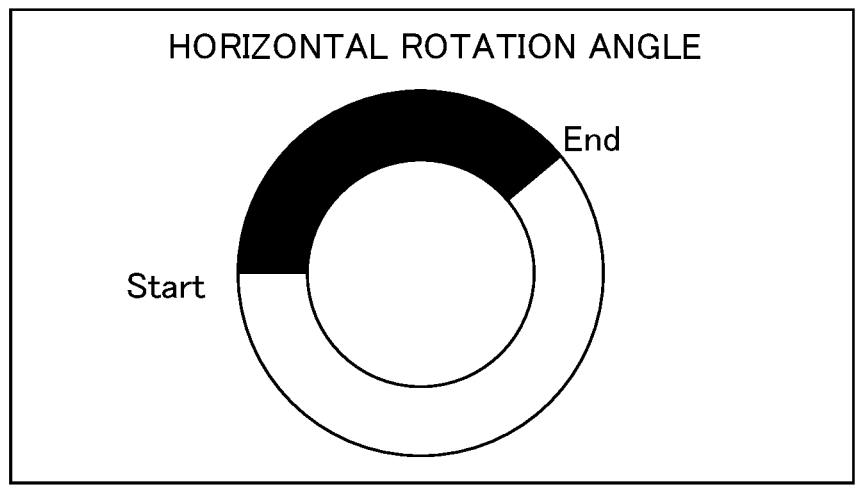
FIG. 11A and FIG. 11B are views depicting examples of angles through which a camera of the information processing terminal in FIG. 1A to FIG. 1C may be rotated.
Figure 11B:
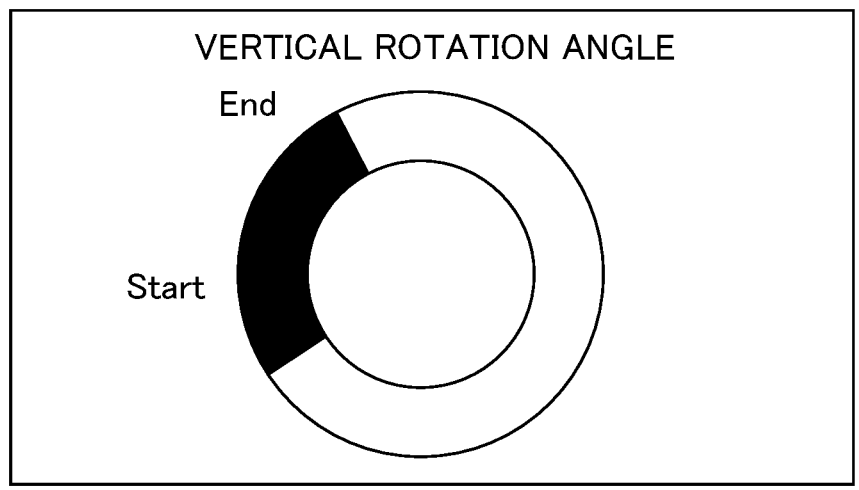

The information processing terminal 1 may, for example, rotate the camera in a horizontal direction through an angle as illustrated in FIG. 11A, and may rotate the camera in a vertical direction through an angle as illustrated in FIG. 11B.

When taking a photograph of a subject, a user may want to conceal a background behind the subject for reasons such as, for example, not wanting an untidy room to be shown, wanting to provide a white background to focus attention on a person or product, and so forth. Conventionally, a lens on a camera has been used to apply blurring, or two or more cameras have been used, distances calculated and blurring applied. However, it is difficult to neatly blur or erase a background accurately with the single camera of an ordinary smartphone or a lens on a smartphone. In contrast, according to an embodiment of the information processing terminal of the present invention as illustrated in FIG. 12A to FIG. 13F, the information processing terminal 1 may neatly erase or blur only the background of a captured image.

Figure 12C:
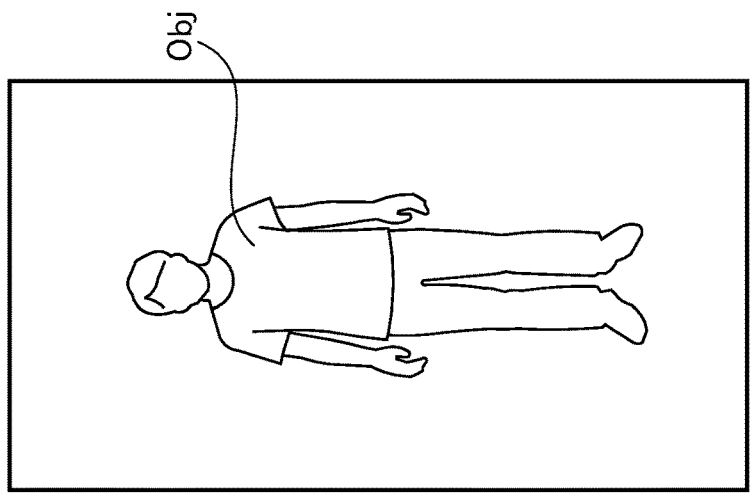
FIG. 12A, FIG. 12B and FIG. 12C are views depicting a procedure for using the information processing terminal in FIG. 1A to FIG. 1C to capture an image in which only a background is erased.
Figure 12B:
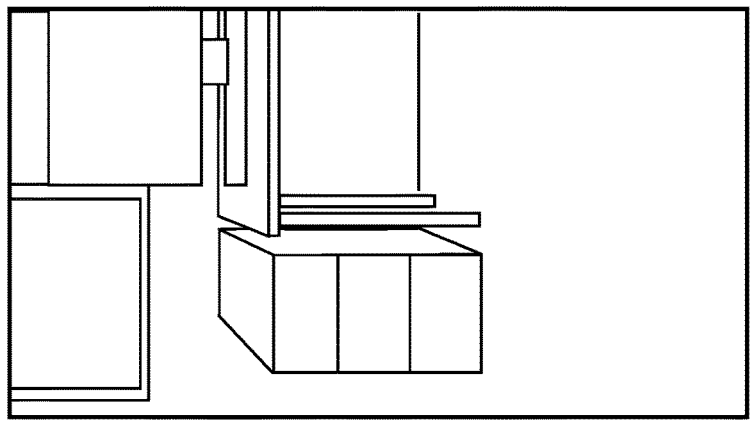
Figure 12A:
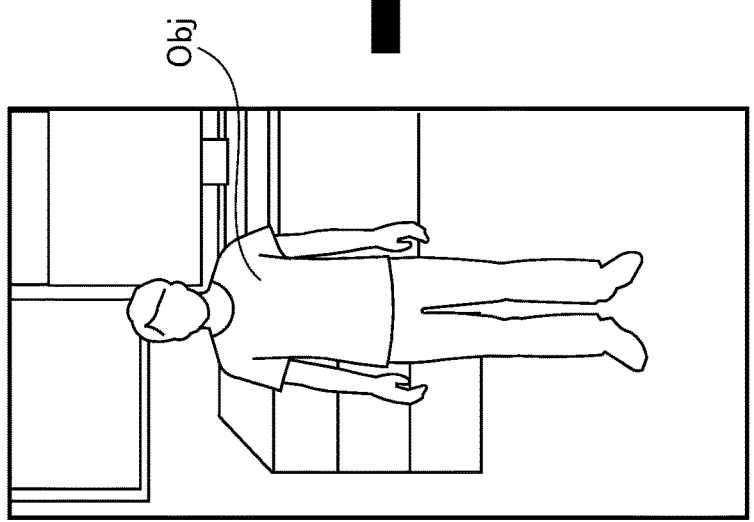
Figure 13F:
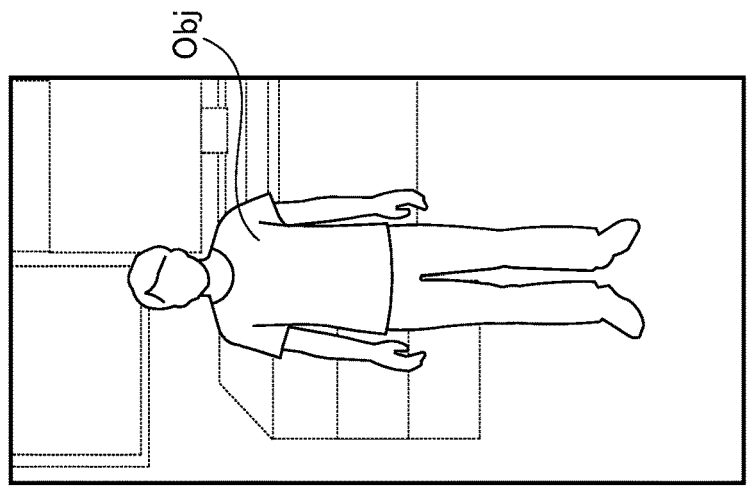
FIG. 13D, FIG. 13E and FIG. 13F are views depicting a procedure for using the information processing terminal in FIG. 1A to FIG. 1C to capture an image in which a background is blurred.
Figure 13E:
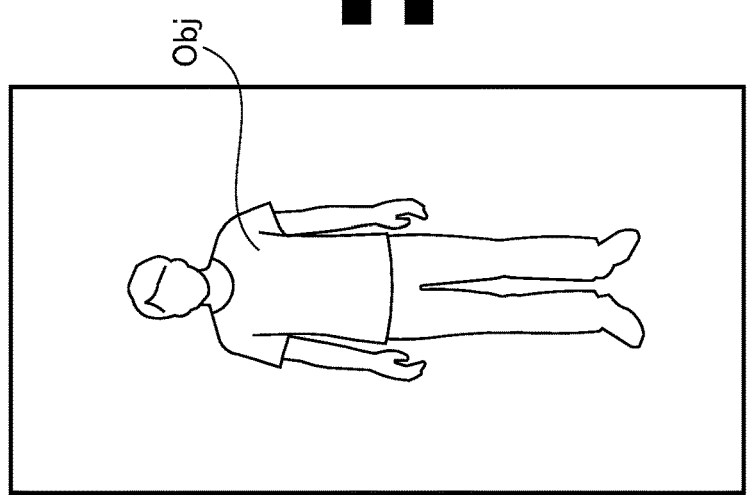
Figure 13D:
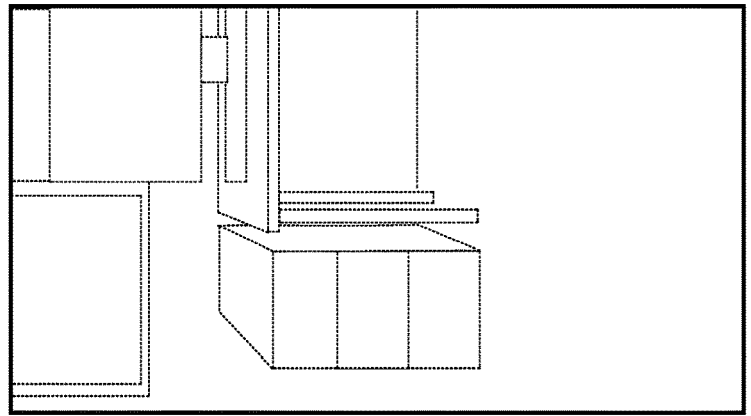

An image showing an object Obj such as a product, a person or the like is captured as illustrated in FIG. 12A. Before or after this, an image of the background alone in which the object Obj does not appear is captured, as illustrated in FIG. 12B. Then, parts of the image that are present in FIG. 12B are subtracted from the image in FIG. 12A, and an image in which the object Obj alone remains may be created, as illustrated in FIG. 12C. When an image in which only the object remains as in FIG. 12C is created, this image may be composited with a blurred image in which the image of the background alone is blurred, as in FIG. 13D. Thus, an image in which the background is neatly blurred as in FIG. 13F may be created. In a video image, a moving object may be displayed alone by processing similar to that for still images. Thus, application to image analysis of a security camera or the like is possible.

A user may want to capture a still image or video image for comparison with a previous photograph such as when, for example, comparing a photograph of a house before a renovation with a photograph after the renovation, making a comparison in order to check the effect of a detergent, or the like. There are very few camera or smartphone applications that enable viewing of a previous photograph while capturing an image with the same composition.

Figure 14B:
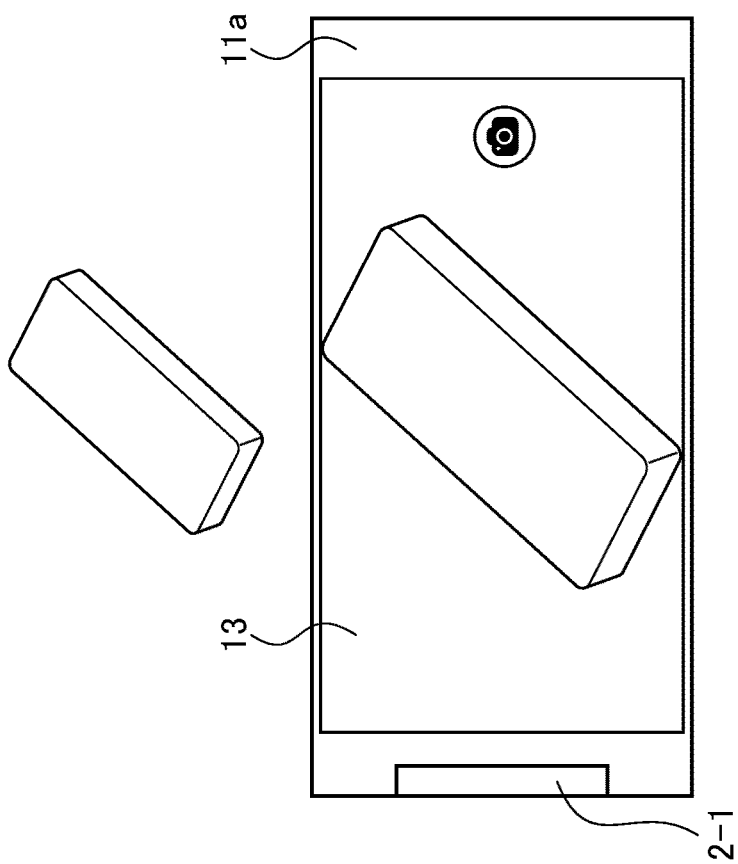
FIG. 14A and FIG. 14B are views depicting a state in which an image for comparison with a previous photograph is captured using the information processing terminal in FIG. 1A to FIG. 1C.
Figure 14A:
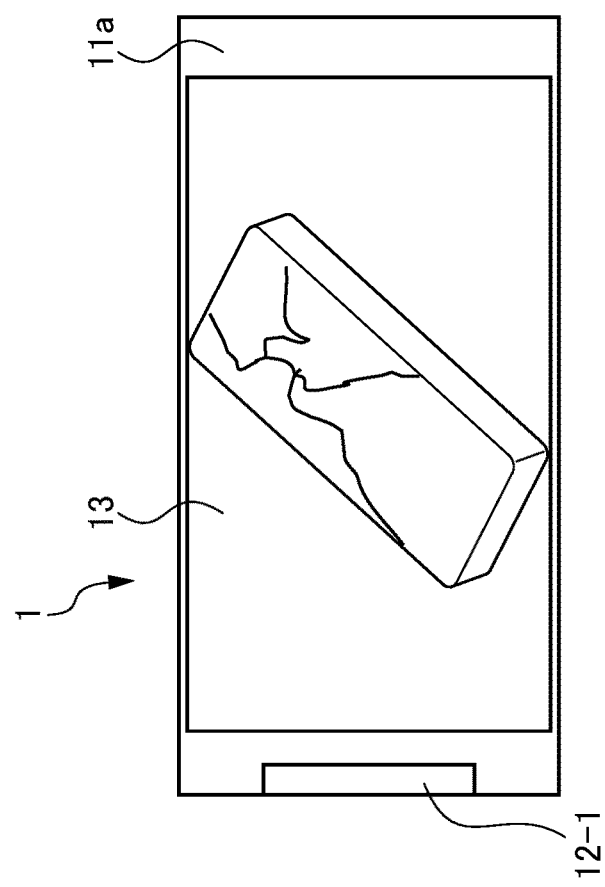

In contrast, according to an embodiment of the information processing terminal of the present invention, a still image or video image for comparison with a previous photograph may be captured easily. As illustrated in FIG. 14A and FIG. 14B, the information processing terminal 1 may display data of a previous photograph semi-transparently or may, with a single button, switch display from a live view image from the camera capturing the image to the photograph that is to be compared with. The display may return to the camera live view image automatically or may be returned to the camera live view image by a single action (pressing the button, pressing a remote control button, performing a voice operation or the like). Thus, a photograph for comparison may be captured easily.

A person who is not used to operating a smartphone or tablet may find it difficult to understand a user interface (UI) in which visible icons cannot be directly operated. Accordingly, devices such as the XPERIA TOUCH that may project a large image with a projector and may be operated by touches of the projection screen have been brought to market. However, prices are high and these devices have many limitations, such as touches not being effective if a projection distance is further than a certain distance. Furthermore, the larger the image, the further a hand must be moved to reach the screen for touching. It is difficult to claim that these devices are easy to use. In other words, it is difficult to make close-range operations that are performed while holding a screen in hand and long-range operations that are performed at a distance from the screen equivalent.

Figure 15:
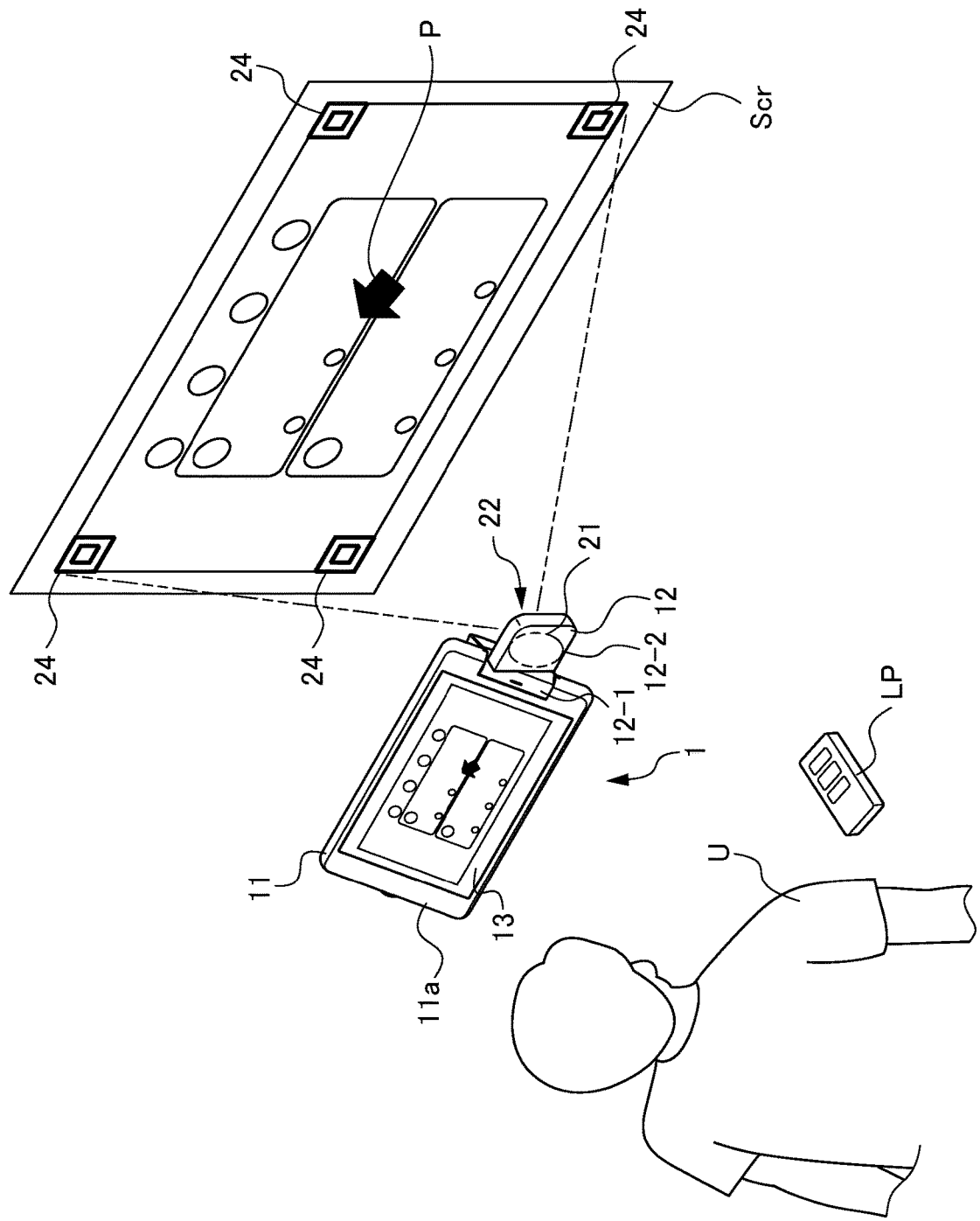
FIG. 15 is a view depicting a state in which a laser pointer is used to operate the information processing terminal in FIG. 1A to FIG. 1C.

In contrast, according to an embodiment of the information processing terminal of the present invention as illustrated in FIG. 15, a video image is displayed at the display unit 13 of the information processing terminal 1, the video image is outputted to a large screen such as a TV, a projector or the like by wireless or by wire, and operations may be performed with a device such as a laser pointer LP or the like that can superimpose an indicator on the large screen. For example, three or more markers 24 may be displayed as portions of the video image on the screen Scr. The camera 21 of the information processing terminal 1 may capture images of a cursor P from the laser pointer LP and the three or more markers 24. Thus, relative positions of the video image on the screen Scr and the cursor P may be identified. The laser pointer LP may be provided with an on/off button for the cursor P and also with an enlarge/reduce button for the cursor P. The enlarge/reduce button may be integrated with the on/off button for the cursor P. When the screen is enlarged or reduced, a change of color, shape or the like of the cursor may accompany this change. The cursor P is not limited to a single point; plural cursors may be detected simultaneously. At a time of an enlargement or reduction operation, detection may be performed such that the video image is enlarged when two cursors are moved apart and the image is reduced when the two cursors are brought closer together. To make the cursor P easier to identify and be recognized by the information processing terminal 1, the video image of the display unit 13 that is projected by the TV, projector or the like and the video image on the screen on which the cursor P is projected may be captured in real-time, and the path of the cursor P may be easily identified and recognized simply from differences between these images. Additionally, the display unit 13 of the information processing terminal 1 and the display that is outputted to the television receiver, projector or the like do not necessarily have to be the same. For example, images captured by the camera 21 may be displayed at the display unit 13 of the information processing terminal 1 or, with the aim of easing processing, nothing may be displayed at the display unit 13.

Nomadic workers who carry a laptop computer or the like, perform work wherever they arrive, and do not have a fixed office or desk are becoming more numerous. However, when there is a lot of baggage such as a laptop computer and the like to be transported, the baggage is heavy and bulky during transport, and transport is troublesome. Alternatively, if, rather than transporting a laptop computer, work is done only with a smartphone, text input is time-consuming because there is no physical keyboard. Voice input is possible but cannot be used in offices requiring quietness. Dedicated low-profile keyboards and the like are commercially available, but repeatedly buying low-profile keyboards is costly. For manufacturers producing keyboards, it is impractical to produce keyboards for particular languages that do not sell well or to customize keyboards.

Figure 17:
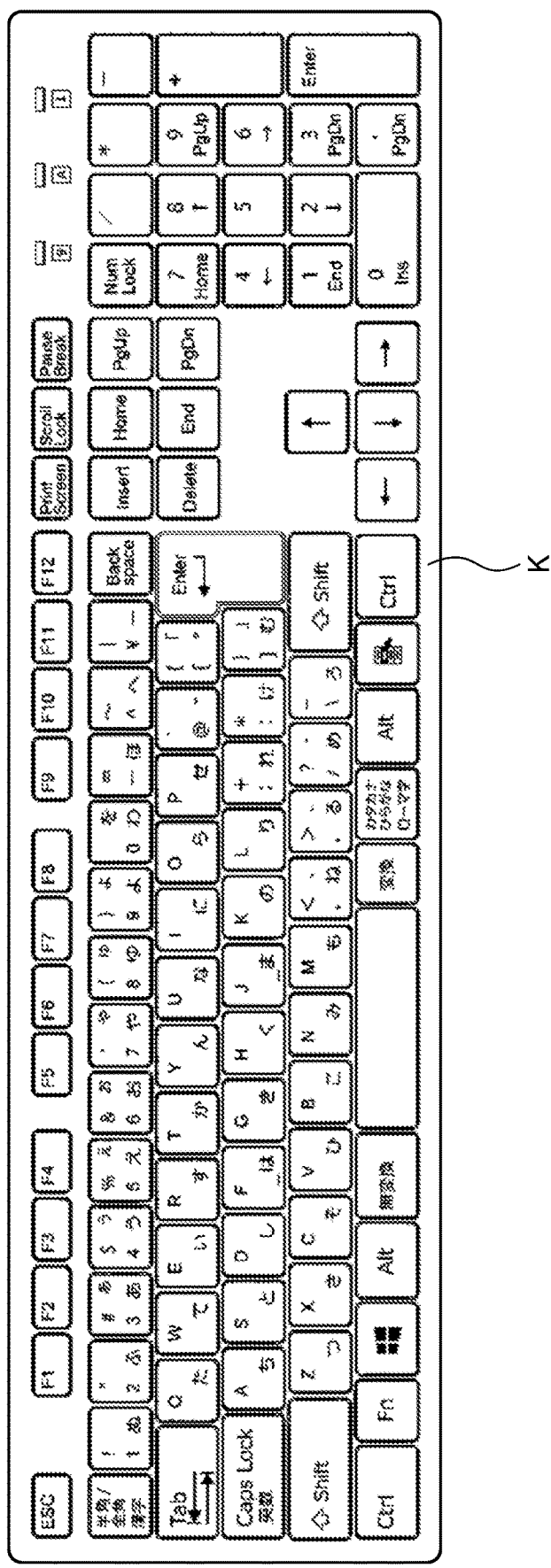
FIG. 17 is a view depicting an example of the printed keyboard.

In contrast, according to the embodiment of the information processing terminal of the present invention, a keyboard printed on a very thin material such as paper or the like may be used as illustrated in FIG. 16. This is excellent in regard to portability and fabrication costs. The camera 21 of the information processing terminal 1 in FIG. 16 may be fixed by using the stand 14 to stand up the information processing terminal 1 and using the biaxial rotation mechanism of the camera. Hence, the printed keyboard K is imaged, fingers placed on the keyboard K are imaged by the camera, and positions pressed the by fingers may be detected. For example, a QR code (registered trademark) QR may be printed in the vicinity of the keyboard K, and the layout of the keys of the printed keyboard K may be immediately identified by the QR code QR being imaged by the camera 21. As another example, three or more of the markers 24 may be printed in the vicinity of the keyboard K, key regions of the keyboard K may be specified, relative positions of the keys being pressed may be identified, and text may be entered by fingers pressing the printed keyboard K. The keyboard K may of course have a common layout as illustrated in FIG. 17 and, because the keyboard K may be fabricated by printing, the keyboard K may be customized exactly as required without concern for commercial demand. For example, keys for "Hello", "I am Ichiro Suzuki", "I am", "Thank you" and so forth may be created and, rather than entering individual characters, complete phrases may be entered as units. By such applications, videogame controllers, musical instruments, video editing desks and DJ mixing desks may be created by printing. Handwritten texts and drawings may also be imaged by the camera, enabling handwritten input.

When a smartphone is placed on a desk and stood up with a stand or the like, and touch operations of the smartphone are performed, because the display at the body is being touched, the smartphone body may be moved backward, the smartphone may fall over, and the stand of the standing smartphone may collapse.

In contrast, according to an embodiment of the information processing terminal of the present invention as illustrated in FIG. 18, rather than the information processing terminal 1 being operated directly, movements of a finger Fn and touches against a table may be imaged by the camera 21, the movements of the finger Fn may be linked with movements of a cursor P, and the information processing terminal 1 may be operated in a similar manner to operation of a computer touchpad. Similarly, if, for example, a thumb is kept on the table and an index finger is moved up and down, operations similar to moving a jog dial of a mouse are possible. Handwritten text may be entered in the same vicinity.

There are many people who would be satisfied with using a navigation app on a smartphone as a car navigation system, rather than dedicated equipment. However, for reasons such as actual scenery appearing different from maps, roads may be misidentified. In order to avoid such misunderstandings, augmented reality (AR) navigation is available. However, when AR navigation is used, the smartphone must be placed at an angle that is difficult for a driver to see. Moreover, the smartphone must be placed at a position that may hinder driving. Using a smartphone as a driving recorder also produces similar problems.

Figure 19B:
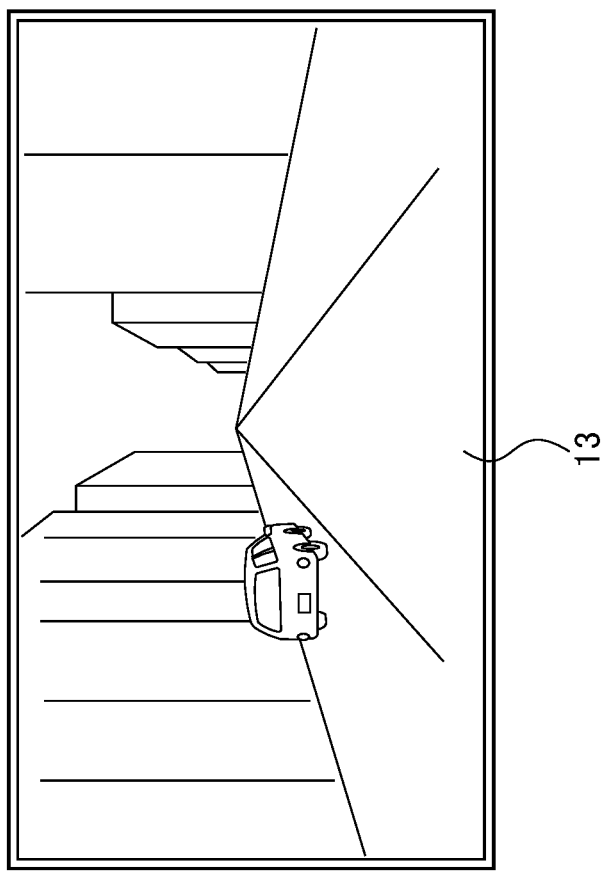
FIG. 19A and FIG. 19B are views depicting a state in which the information processing terminal in FIG. 1A to FIG. 1C is used as a car navigation system.
Figure 19A:
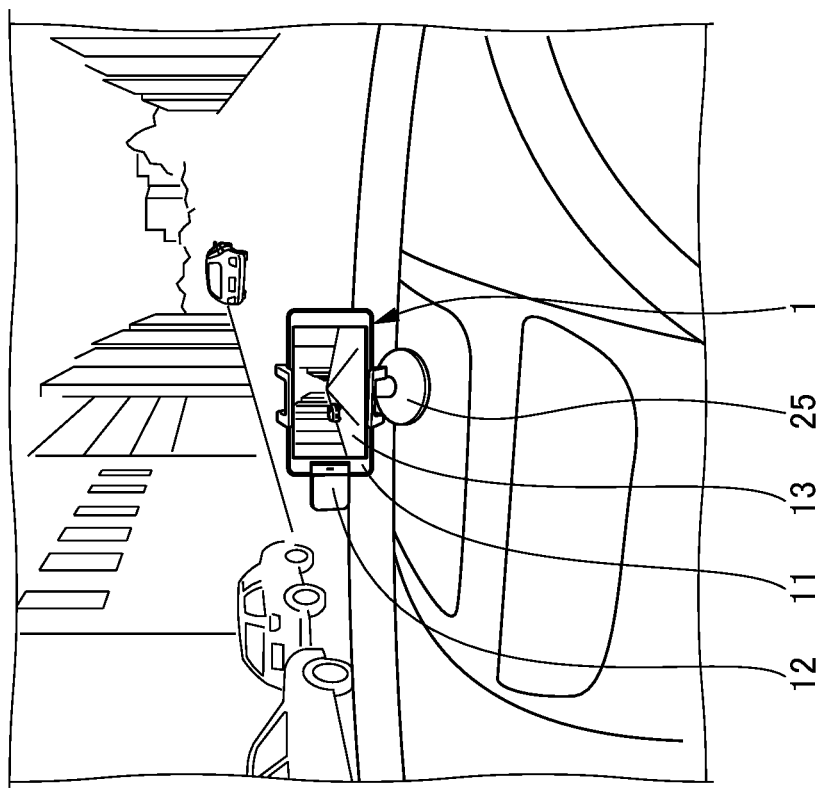

In contrast, according to an embodiment of the information processing terminal of the present invention as illustrated in FIG. 19A and FIG. 19B, the information processing terminal 1 includes the camera 21 that can be rotated about plural pivot axes. Therefore, the information processing terminal 1 may be fixed to a car phone holder 25 and the information processing terminal 1 may capture a video image in the progress direction of the car with the camera 21, to act as AR navigation and as a driving recorder. At the same time, the display unit 13 of the information processing terminal 1 may be directed at an angle that is easy for the driver to see.

During driving of a car or the like, it is common to use a driving recorder and a car navigation system or the like. A variety of problems with drivers can be inferred from movements of the car with this equipment; for example, a likelihood of falling asleep while driving, a likelihood of driving while intoxicated and the like. However, these problems can only be inferred from movements of the car; the condition of a driver cannot be directly examined.

Figure 20A:
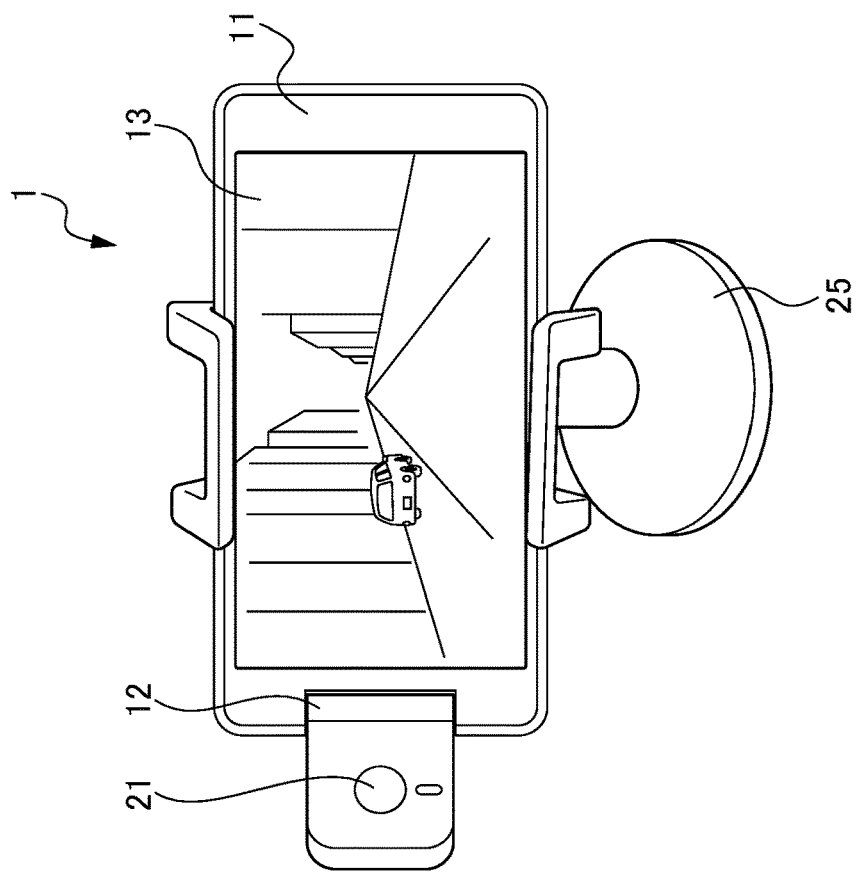
FIG. 20A and FIG. 20B are views depicting the state in which the information processing terminal in FIG. 1A to FIG. 1C is used as the car navigation system.
Figure 20B:
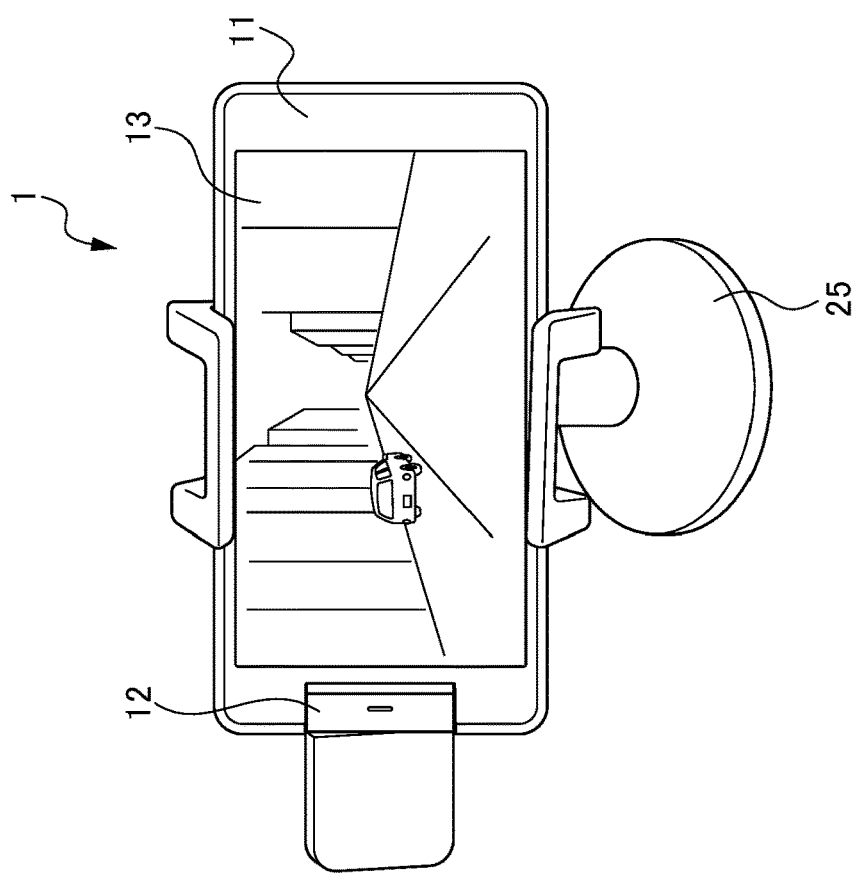

In contrast, according to an embodiment of the information processing terminal of the present invention, the camera 21 of the information processing terminal 1 usually images in the progress direction as illustrated in FIG. 20A. However, when a hazard or the like is detected, the camera 21 rotates as illustrated in FIG. 20B and images the face and the like of the driver, and may check the condition of fitness of the driver.

Fixed cameras such as the AMAZON ECHO LOOK and the like are available that may image clothes being worn from day to day. However, if the positions of image capture do not match up from day to day, the scale of the person who is being imaged may vary, and poses also vary. As a result, clear comparisons cannot be made.

Figure 21A:
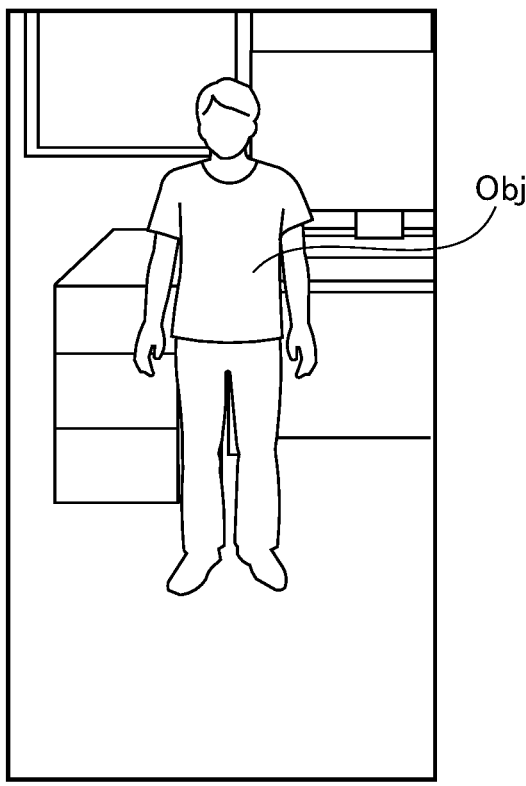
FIG. 21A and FIG. 21B are views depicting a state in which the information processing terminal in FIG. 1A to FIG. 1C is used to photograph an object of imaging at a suitable position.
Figure 21B:
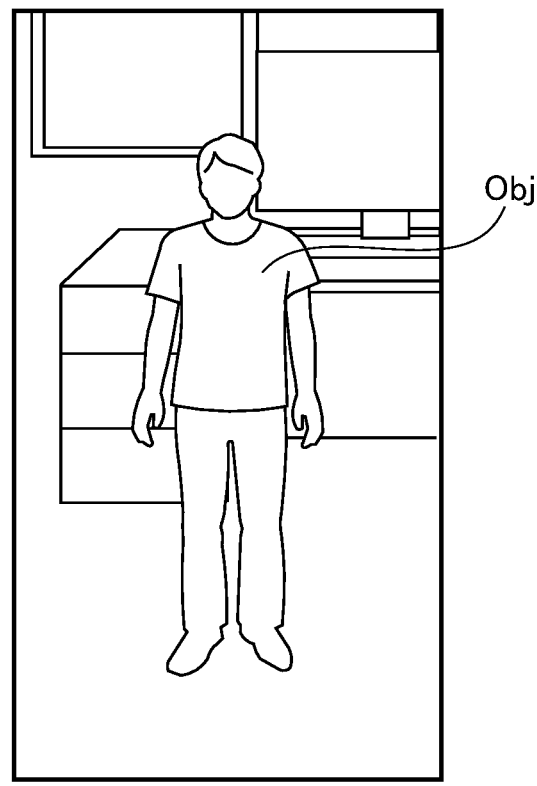

In contrast, according to an embodiment of the information processing terminal of the present invention, when a current captured image as illustrated in FIG. 21A is to be compared with, for example, a previous photograph as illustrated in FIG. 21B, the camera 21, a swivel cradle 26 or the like may be rotated by electric driving and adjusted such that an object Obj is brought to a suitable position, and a guide to adopting a pose may be displayed at the display unit 13 such that the poses are the same. As the guide, for example, a hand-drawn guide entered by the user may be displayed. In addition, a state of health of the user may be checked at the same time as the image capture, and the shutter may be released by a voice instruction or gesture.

When a rotatable camera is being used for AR walking navigation, the direction of the camera changes when the direction of the smartphone changes, and the person viewing the display may be disoriented.

Figure 22A:
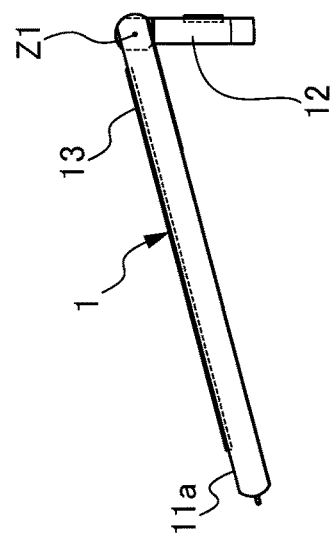
FIG. 22A, FIG. 22B and FIG. 22C are views depicting a state in which the information processing terminal in FIG. 1A to FIG. 1C is used with the direction of the camera being kept horizontal.
Figure 22B:
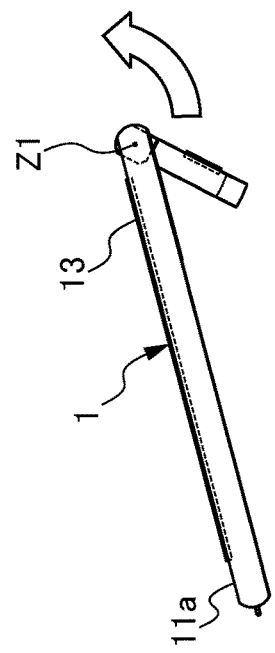
Figure 22C:
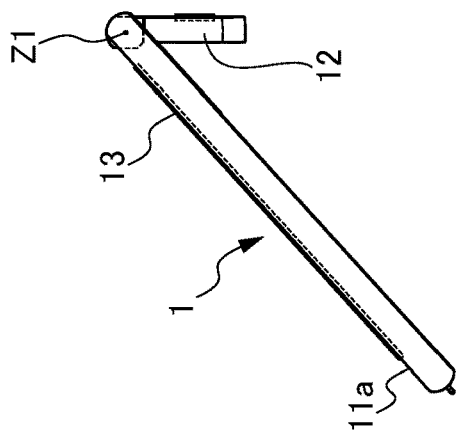

In contrast, according to an embodiment of the information processing terminal of the present invention as illustrated in FIG. 22A to FIG. 22C, the camera 21 may be electronically controlled using data from a G-sensor or the like so as to continuously direct the camera 21 in a fixed direction (for example, the horizontal direction), using the pivot axis Z1, and an image displayed at the display unit 13 of the information processing terminal 1 may be kept constant.

To read a document written in a language that a user does not understand, the user must study the language and interpret the meaning or wait for a translation into the user's language. For a person who wants to read a document immediately, this is a great hurdle.

In contrast, according to an embodiment of the information processing terminal of the present invention as illustrated in FIG. 23, a document B is imaged by the camera 21 and optical character recognition (OCR) is applied. Thus, text data is recognized, and a translation may be displayed at the display unit 13 of the information processing terminal 1. The document B is imaged page by page as still images or video images without needing separate shutter presses, using turning of the pages as a trigger, and translation is performed. Reloading of pages may be performed by voice, and may be performed by sound. Obviously, the document B may be converted to text data with using this function. Because the information processing terminal 1 has plural pivot axes at the coupling unit 12, the angle of the camera 21 can be altered independently of the direction of the display unit 13, and this function is possible. When the information processing terminal 1 is placed on the swivel cradle 26, a distance in the height direction may increase, which facilitates the image capture. In addition, by movements of the pivot axes of the information processing terminal 1 being made to combine rotation of the swivel cradle 26, the direction of the camera 21 may be made to correspond appropriately with the document B that is being imaged. As a result, the text may be converted to data more accurately.

When a cash register is used to collect payments in a store, a commercial cash register is usually used. However, these are very expensive and require processes such as scanning products with a barcode reader, detecting RFID tags attached to products, and entering product information into the cash register. In particular, in the case of barcode entry, because it can be difficult to position barcodes, store staff need to be experienced in barcode entry operations. In a small business such as a bakery or the like, barcodes cannot be attached to bread itself. Accordingly, shop staff press buttons for products at the cash register.

In contrast, according to an embodiment of the information processing terminal of the present invention as illustrated in FIG. 24, the information processing terminal 1 that can rotate the camera 21 is used, or the information processing terminal 1 is placed on the swivel cradle 26 and the rotating mechanism of the information processing terminal 1 is used in combination with the swivel cradle 26. The direction of the camera 21 is automatically altered to match the positions of barcodes, and the camera 21 may accurately read the barcodes of products being purchased such as, for example, chocolate Ch, a drink bottle Pb and the like. Furthermore, characteristics such as product shapes and the like may be recognized in advance. Thus, information such as product names, prices and the like may be identified even for products to which barcodes are not attached, such as bread and the like.

Entries for domestic bookkeeping and accounts may be simplified by imaging receipts and the like with a camera when products are purchased. However, the receipts must be placed for this imaging, the camera must be prepared, and a shutter button must be pressed, which is very inconvenient.

Figure 25:
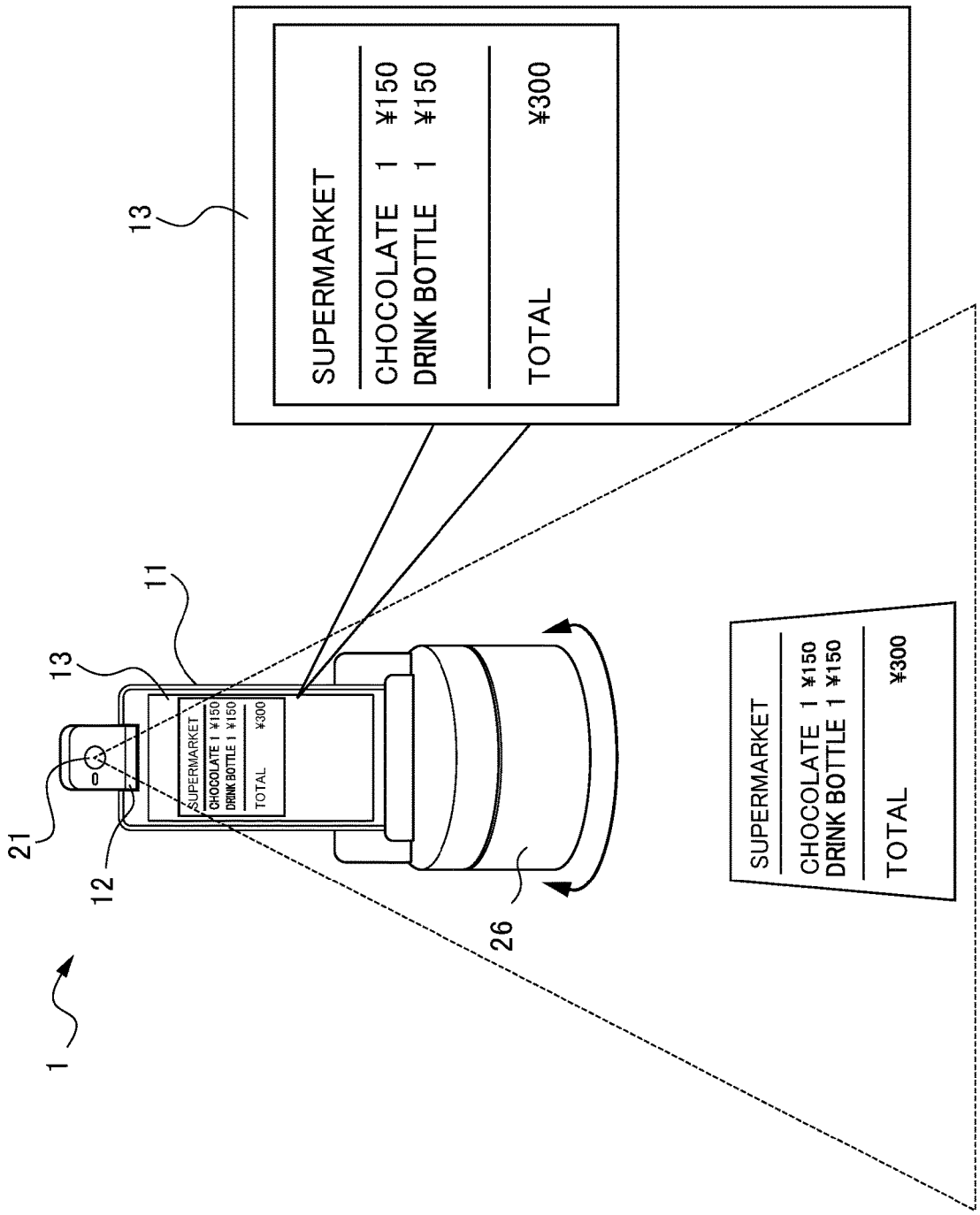
FIG. 25 is a view depicting a state in which the information processing terminal in FIG. 1A to FIG. 1C is used to read a receipt.

In contrast, according to an embodiment of the information processing terminal of the present invention as illustrated in FIG. 25, the information processing terminal 1 that can rotate the camera 21 may be placed on the swivel cradle 26 on a table, realizing a separation in the height direction. By rotation of the information processing terminal 1 in combination with rotation of the swivel cradle 26, receipts on the table may be automatically imaged without individual operations (such as pressing a shutter button). Provided imaging is possible, the swivel cradle 26 is not necessarily required. The imaged receipts and the like may be subjected to OCR, and text data may be recognized and entered. The user needs to operate the information processing terminal 1 and the swivel cradle 26 very little, and may concentrate on placing the receipts and the like. Particularly on a flat surface such as a table, it is easy to array receipts and the like.

When a product is to be listed in an auction app, a flea market app or the like, photographs must be taken from various angles for purchasers wishing to know about the condition of the product, which is an inconvenience in selling.

Figure 26:
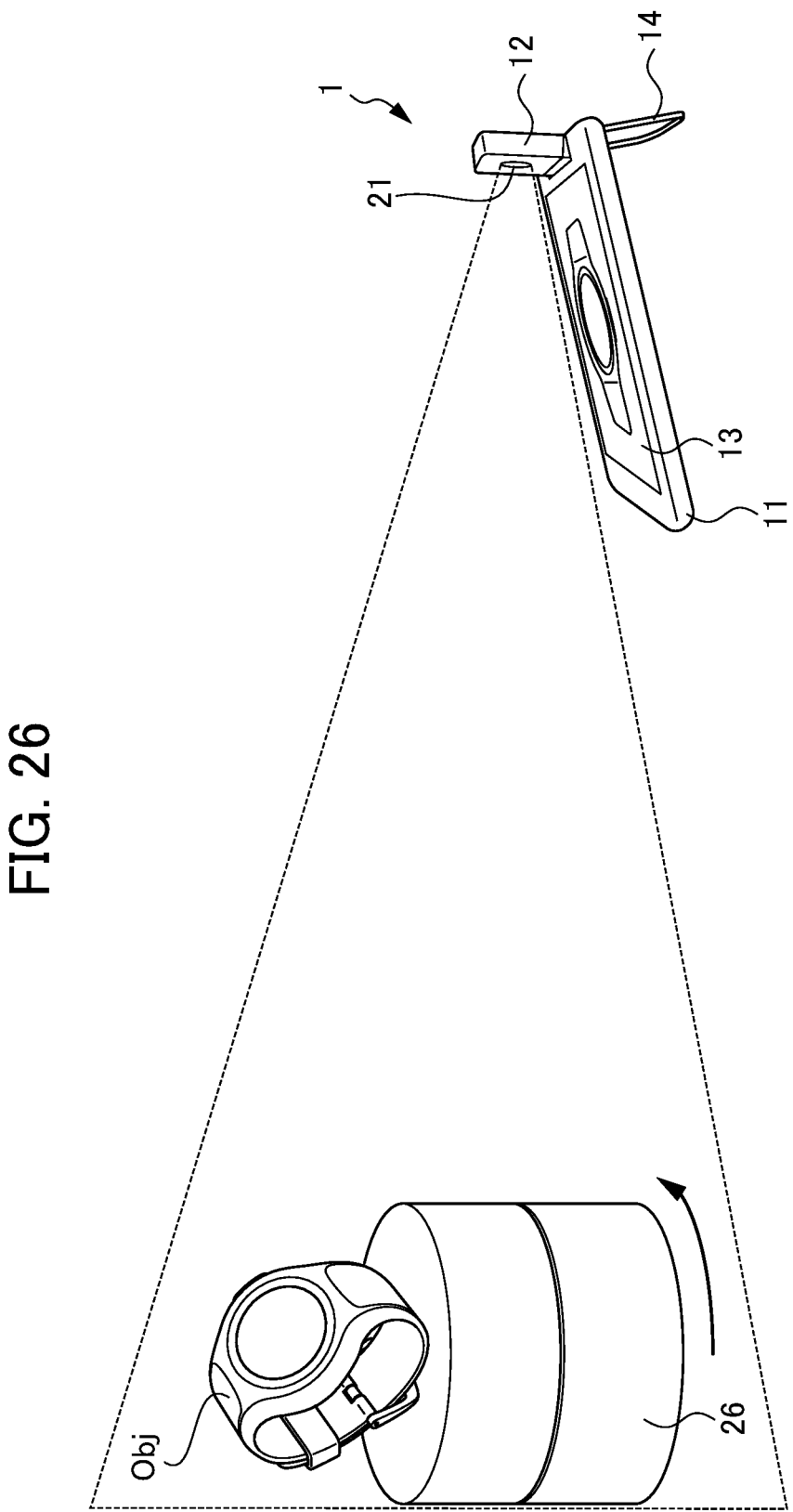
FIG. 26 is a view depicting a state in which the information processing terminal in FIG. 1A to FIG. 1C is used for imaging while a product is being rotated.

In contrast, according to an embodiment of the information processing terminal of the present invention as illustrated in FIG. 26, a pedestal attachment may be fixed to the swivel cradle 26, a product to be imaged placed on the swivel cradle 26, and the information processing terminal 1 fixed with the stand 14. Then, using the camera 21 of the information processing terminal 1 while controlling rotation of the swivel cradle 26 from the information processing terminal 1, the product may be imaged 360° around.

When clothing is to be listed in an auction or flea market application or the like, photographs must be taken from various angles for purchasers wishing to know about the condition of the item, which is an inconvenience in selling. Because clothing or the like is imaged while hanging, a different solution from that in FIG. 26 is required.

Figure 27:
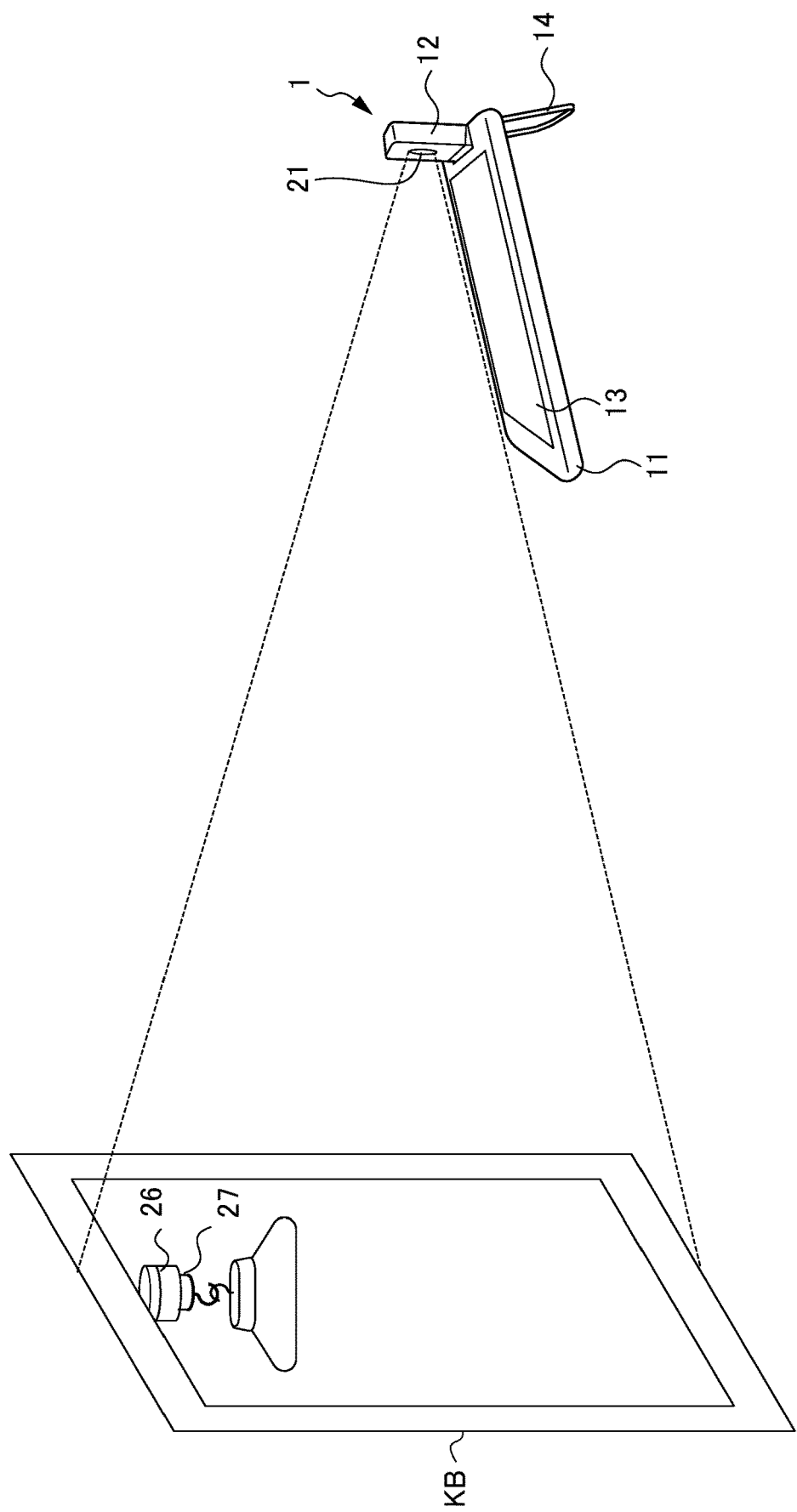
FIG. 27 is a view depicting a state in which the information processing terminal in FIG. 1A to FIG. 1C is used for imaging while a product is being rotated.

In contrast, according to an embodiment of the information processing terminal of the present invention as illustrated in FIG. 27, a hanger attachment 27 may be fixed to the swivel cradle 26, and the item may be hung from a hanger or the like below the swivel cradle 26. Using the camera 21 of the information processing terminal 1 fixed with the stand 14 while controlling rotation of the swivel cradle 26 from the information processing terminal 1, the hanging item may be imaged 360° around.

A digital camera, smartphone or the like can take a composite panorama shot by the camera being moved horizontally. However, the camera, smartphone or the like must be moved horizontally smoothly. Neat composition is often not possible. If vertical movement as well as horizontal movement is possible, an extremely large photograph may be composited. In this case too, neat composition is often not possible.

Figure 28:
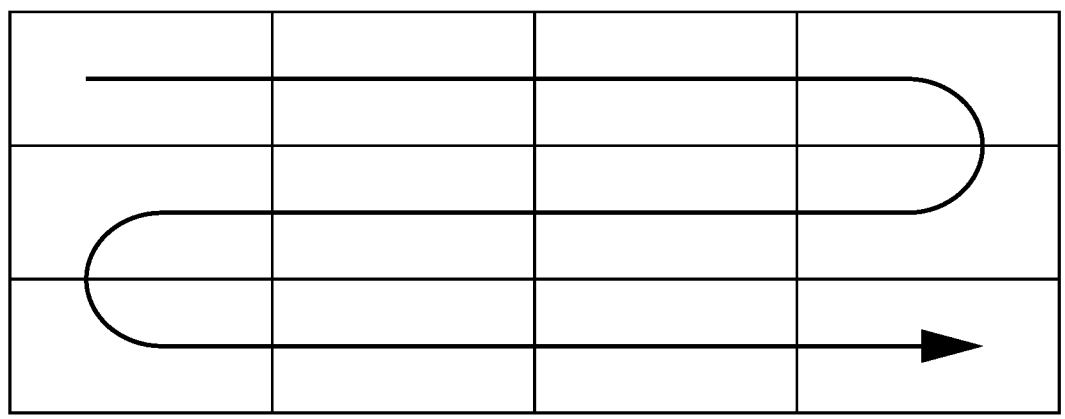
FIG. 28 is a view depicting a state in which the information processing terminal in FIG. 1A to FIG. 1C is used to capture a panorama image.

In contrast, according to an embodiment of the information processing terminal of the present invention, panorama imaging in the vertical direction and the horizontal direction as illustrated in FIG. 28 is possible, by the camera 21 of the information processing terminal 1 being operated while the plural pivot axes are moved. Thus, a larger photograph may be taken. An even larger range than when only the pivot axes of the information processing terminal 1 are used may be imaged by placing the information processing terminal 1 on the swivel cradle 26 and using the pivot axes of the information processing terminal 1 to move the camera viewpoint in the vertical direction in correspondence with horizontal rotation of the swivel cradle 26, or the like. Because this image capture may be electrically driven, neat composition is possible. When vertical and horizontal composition are combined, a larger photograph may be taken. When conducting a scan, determining a scanning sequence on a single stroke increases scanning efficienty.

When teaching is being conducted via a video chat on the Internet or the like, written matter sometimes needs to be shown to a communication partner. It is common for a participant to write something and then show the completed writing to a camera. However, this means that intermediate stages in the process of writing cannot be seen.

In contrast, according to an embodiment of the information processing terminal of the present invention as illustrated in FIG. 29A, the camera 21 of the information processing terminal 1 at a teacher Tc side of a video chat may be rotated, and thus written matter B on a table may be automatically imaged without a shutter button being pressed. Keystone correction and vertical inversion may be applied, and the written matter B and the face of the teacher Tc may be simultaneously displayed at the display unit 13 of the information processing terminal 1 at a student side of the video chat, as illustrated in FIG. 29B. In this situation, if a height from the table to the camera is insufficient and not all of the paper can be imaged, a stand or the like on which the information processing terminal 1 can be vertically stood may be used. If the swivel cradle 26 is used, a separation in the height direction may be realized and, using vertical rotation of the camera in correspondence with horizontal rotation of the swivel cradle 26, the camera rotation function of the information processing terminal 1 may image a larger range than rotation of the information processing terminal 1 alone. In practical use, camera operations and rotations may be conducted by remote control; even control over a network is possible. In order to protect privacy, limitations may be applied to movements of the camera; markers indicating now imaging may be applied. A setting such that, for example, operations (altering the direction of the camera 21) are not permitted over a network may be made from equipment (a camera, a smartphone or the like) at the side at which operations are conducted. To make it clear that imaging is being conducted, an LED, display screen or flashlight may be illuminated, a vibration or noise may be produced, an aroma may be emitted, or a captured image may be displayed at the display. Entry of a password may be required for conducting operations. Settings may be made, to allow or disallow settings of whether an LED is illuminated and whether an image is displayed during image capture, at each of the side at which operations are conducted and the side that is operated.

At a party, a social function or the like, when a photograph of the gathering is to be taken, someone has to act as photographer to press a shutter button. Although robotic pan-tilters that capture images automatically are available, they do not understand where people are located and rotate in accordance with guesswork. Therefore, photographs with really good composition may not be taken.

Figure 30:
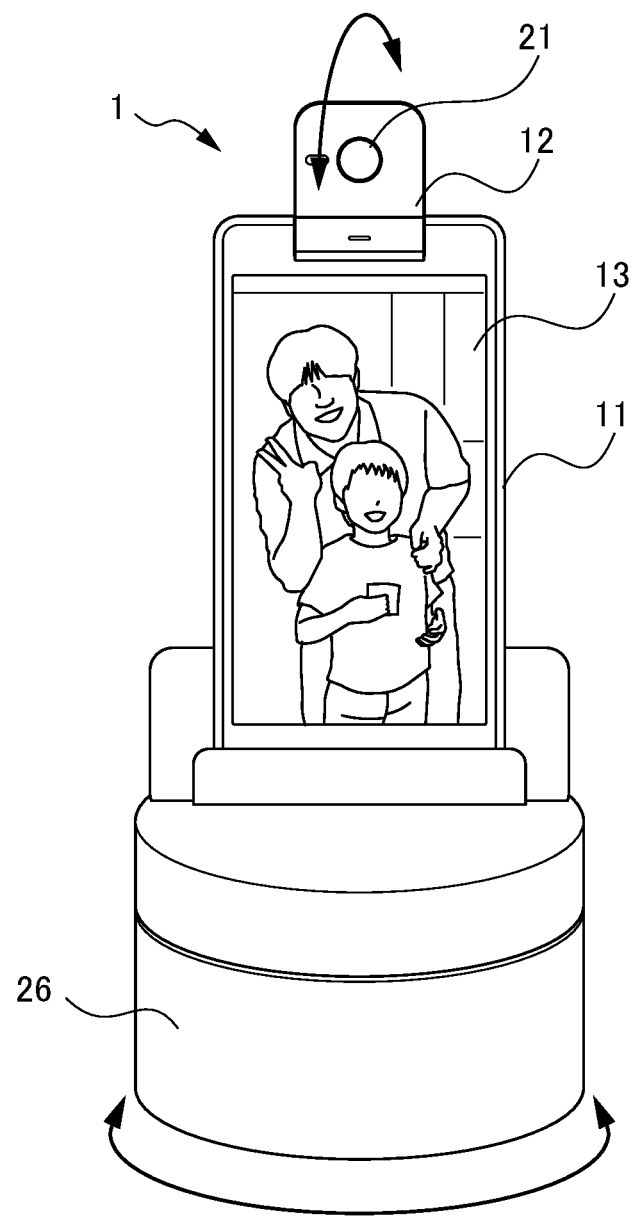
FIG. 30 is a view depicting a state in which the information processing terminal in FIG. 1A to FIG. 1C is used to perform automatic photography.
Figure 31:
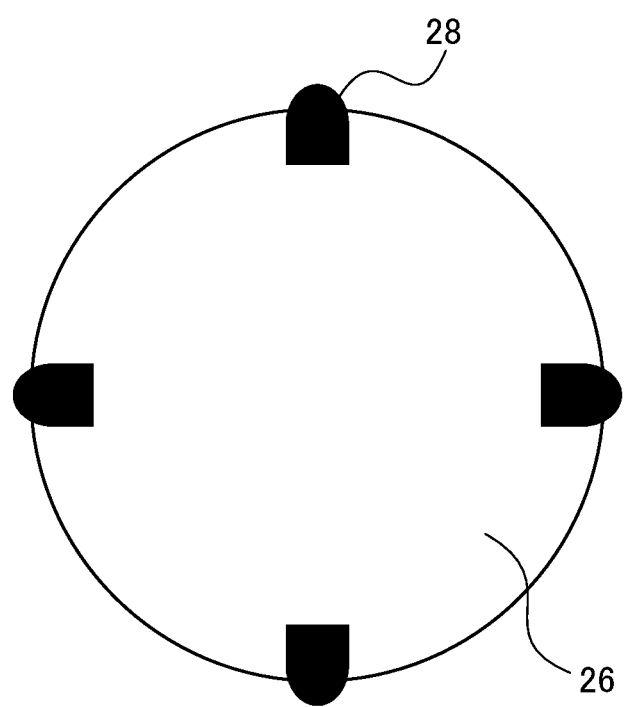
FIG. 31 is a diagram showing a swivel cradle equipped with sensors.

In contrast, according to an embodiment of the information processing terminal of the present invention as illustrated in FIG. 30, the information processing terminal 1 with the rotatable camera 21 may be placed on the swivel cradle 26 on a table. Hence, rotation of the swivel cradle 26 may be combined with rotation of the camera 21 of the information processing terminal 1, and the camera 21 may be directed in various directions. Human detection sensors 28 incorporated in the swivel cradle 26 as illustrated in FIG. 31 or in the information processing terminal 1 may identify positions at which people are located. Hence, the people may be clearly imaged by rotation of the camera 21 without rotation by guesswork. Even without the swivel cradle 26, when the camera 21 of the information processing terminal 1 can be rotated about two or more axes, automatic image capture is possible.

Besides the Human detection sensors 28, for example, plural microphones may be mounted. Hence, the positions of people may be identified by calculations of small differences between the times at which sounds arrive at the microphones, or the like. A subject may be specified and the rotation mechanism may be used to make the camera automatically track the subject. Image capture does not necessarily all have to be performed automatically. Images may be captured by voice commands, and images may be captured by gestures. If people are identified and a person who does not want to be photographed is present, a setting may be made to automatically identify and prevent photography of that person. If a person who does not want to be photographed is registered in the camera beforehand or is manually marked with an "X" during image capture, that person may be identified in image processing and image capture of that person prevented or the like.

One of the primary purposes of a cradle is to supply electric power for charging to a smartphone. Accordingly, the cradle cannot receive electric power from the smartphone. In order to use functions incorporated in the cradle, a power supply such as a battery, an AC adapter or the like is necessary. The battery, AC adapter or the like must be transported with the cradle even for very short times of use.

In contrast, according to an embodiment of the information processing terminal of the present invention, the fact that electric power is not being supplied to the swivel cradle 26 may be automatically detected and electric power may be supplied from the information processing terminal 1 to the swivel cradle 26. Thus, functions such as the Human detection sensors 28 attached to the swivel cradle 26 and the like may be energized with power from the information processing terminal 1.

Various functions may be incorporated in a cradle such that a smartphone can be used in a similar manner to a personal computer, such as equipping an HDMI (registered trademark) terminal to enable video output, equipping a USB-A terminal and so forth. However, a built-in camera of a smartphone often cannot be used in the same way as a built-in camera of a computer due to the position, direction and angle at which the cradle is placed. That is, if there is no function allowing use of the built-in camera of a smartphone and a built-in camera of a computer is mounted above or below a display, the built-in camera of the computer can be directed at a user's face if the display is directed thereat. In contrast, when a smartphone is used as if it were a personal computer, the user's face is directed at a connected monitor. Therefore, the user is not necessarily looking at the smartphone placed in the cradle, and an angle at which the built-in camera of the smartphone is directed is determined by an angle of the cradle. Therefore, the position and direction of the smartphone cradle must be altered for each time of use.

In contrast, according to an embodiment of the information processing terminal of the present invention, when the information processing terminal 1 is placed on the swivel cradle 26 equipped with the Human detection sensors 28 as illustrated in FIG. 31, the camera 21 automatically rises, and the swivel cradle 26 and the pivot axes of the information processing terminal 1 are driven such that an image capture subject is within the frame of the camera 21. Thus, the image capture subject may be kept within the frame of the camera. In addition to using the camera 21 as if it were a built-in camera of a computer, there are various other possibilities such as using images from the camera 21 for facial authentication, using the Human detection sensors 28 and turning off the monitor when nobody is present, and so forth.

For example, plural microphones, plural speakers, plural Human detection sensors, a swivel function, a mobile battery and the like may be incorporated in this swivel cradle 26. Accordingly, the information processing terminal installed at the swivel cradle 26 may be used for various purposes such as displaying information, playing music, newsfeeds, weather forecasts, audiobooks, a calendar, sports news, transport information, shopping, connections with electronics, air conditioners and curtains, and so forth.

In the information processing terminal of the present invention, the body unit 11 and the coupling unit 12 are rotatably connected with one another as described above. Rotation operations of the coupling unit 12 may be manual and may be electric. When rotation operations of the coupling unit 12 are electrified, the information processing terminal is structured, for example, as shown in FIG. 32A and FIG. 32B. FIG. 32A and FIG. 32B depict exterior and interior structures of an embodiment of the information processing terminal according to the present invention, which structures are different from the structures in FIG. 2A to FIG. 2C and the like. FIG. 32A is a rear view of the information processing terminal. FIG. 32B is a sectional view of FIG. 32A. As with FIG. 2A to FIG. 2C, the coupling unit 12 includes the camera base part 12-1 and the camera orientation part 12-2. The circular camera 21 is disposed at the front face of the camera orientation part 12-2 (the face at the side viewed in FIG. 32A).

The camera base part 12-1 is pivot-supported to enable rotation by electric driving of the whole of the coupling unit 12 relative to the body unit 11 about the pivot axis Z1. That is, the camera base part 12-1 is structured so as to rotate about the pivot axis Z1 while end faces of the exterior column shape of the camera base part 12-1 slide against the body unit 11. To enable automatic rotation about the pivot axis Z1, a stepper motor 51, a biaxial hinge 53, a gear 54 and a gear 55 are provided inside the coupling unit 12 (see FIG. 32B). That is, the camera base part 12-1 is automatically rotated about the pivot axis Z1 by rotary driving force of the stepper motor 51 being transmitted to the biaxial hinge 53.

The camera orientation part 12-2, at which the camera 21 is mounted, is supported by a cantilever spindle to be rotatable relative to the camera base part 12-1 about the pivot axis Z3 that is arranged substantially orthogonally to the pivot axis Z1. To enable automatic rotation about the pivot axis Z3, a stepper motor 52, the biaxial hinge 53, the gear 54 and a gear 56 are provided inside the coupling unit 12 (see FIG. 32B). That is, the camera orientation part 12-2 is automatically rotated about the pivot axis Z3 by rotary driving force of the stepper motor 52 being transmitted to the biaxial hinge 53 via the gear 54 and the gear 56. Obviously, the biaxial hinge 53 does not necessarily have to be an integrated biaxial hinge but may be divided into two separate hinges.

Because the stepper motor 51 and the stepper motor 52 are employed, rotation about the pivot axis Z1 and the pivot axis Z3 can be implemented precisely and quickly by electric driving.

Figure 33:
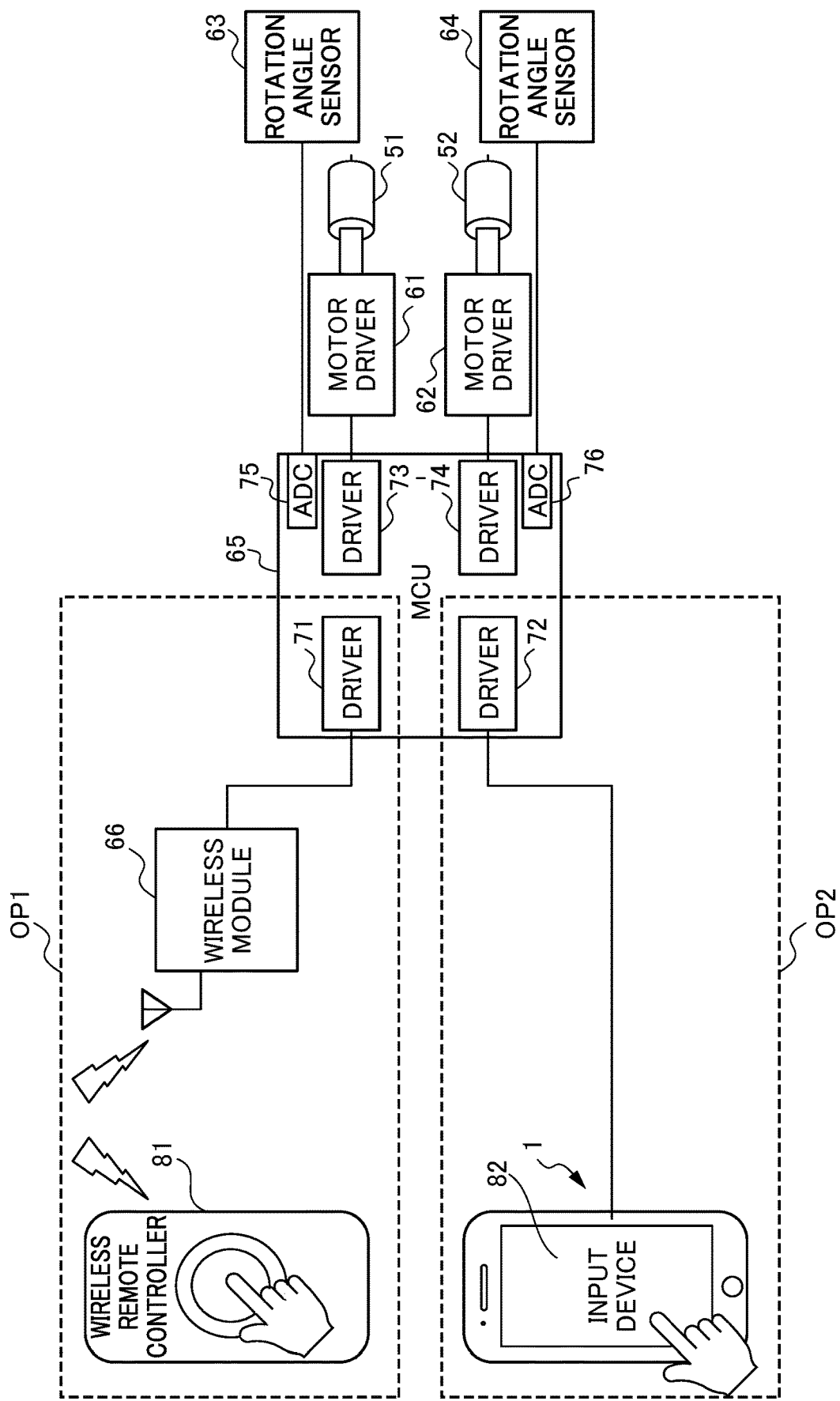
FIG. 33 is a block diagram depicting structures for implementing control of rotation in a case in which stepper motors in FIG. 32A and FIG. 32B are employed.

FIG. 33 is a block diagram depicting structures for implementing control of rotation about the pivot axis Z1 and pivot axis Z3 in a case in which the stepper motor 51 and stepper motor 52 in FIG. 32A and FIG. 32B are employed. In order to implement control of rotations about the pivot axis Z1 and pivot axis Z3 when the stepper motor 51 and stepper motor 52 are employed, a motor driver 61 of the stepper motor 51, a motor driver 62 of the stepper motor 52, a rotation angle sensor 63 of the stepper motor 51, a rotation angle sensor 64 of the stepper motor 52, a microcontroller unit (MCU) 65 and a wireless module 66 are provided. These blocks and the like are illustrated as being outside the information processing terminal 1 as appropriate for this description, but may be incorporated inside the information processing terminal 1. A driver 71 that serves as an interface with the wireless module 66, a driver 72 that serves as an interface with an input driver 82 of the information processing terminal 1, a driver 73 that serves as an interface with the motor driver 61, and a driver 74 that serves as an interface with the motor driver 62 are provided at the MCU 65. Also provided at the MCU 65 are analog-to-digital converters (ADCs) 75 and 76 for converting respective analogue detection signals from the rotation angle sensors 63 and 64 to digital signals.

Commands for rotation of the pivot axis Z1 and pivot axis Z3 (commands for movement of the camera 21) are given as both user commands OP1 using a wireless remote controller 81 and user commands OP2 using an input device 82 of the information processing terminal 1 such as a touch panel or the like. Commands according to the commands OP1 are inputted to the driver 71 of the MCU 65, and commands according to the commands OP2 are inputted to the driver 72 of the MCU 65.

On the basis of commands according to the commands OP1 and respective detection signals from the rotation angle sensors 63 and 64, the MCU 65 applies control to the motor drivers 61 and 62 via the respective drivers 73 and 74.

Because the two rotation angle sensors 63 and 64 are employed, the following possibilities arise. Firstly, absolute positions may be known (positions are not derived by calculations when movements are performed by a user's hand). Secondly, failsafes for preventing movement beyond movement ranges are possible. Thirdly, the direction of the camera 21 may be precisely derived from the combination of a G-sensor in the body and the rotation angle sensors 63 and 64.

Thus, an information processing terminal in which the present invention is employed may encompass various embodiments. That is, embodiments of the information processing terminal in which the present invention is employed are not particularly limited provided the information processing terminal is structured as follows. An information processing terminal in which the present invention is employed includes:

an image capture unit that captures an image of a subject (for example, the camera in FIG. 2A to FIG. 2C);
a body unit (for example, the body unit 11 in FIG. 1A to FIG. 2C), at a predetermined surface of which (for example, the front surface 11a in FIG. 1A to FIG. 2C) a display unit (for example, the display unit 13 in FIG. 1A to FIG. 2C) is disposed, the display unit displaying a captured image captured by the image capture unit that includes the subject; and
a coupling unit (for example, the coupling unit 12 in FIG. 1A to FIG. 2C) that directly or indirectly couples the image capture unit relatively rotatably to the body unit via plural rotation axes, the plural rotation axes including a first rotation axis (for example, the pivot axis Z1 in FIG. 2A to FIG. 2C) for changing an angle between an optical axis direction of the image capture unit and a normal direction of the display unit, and a second rotation axis (for example, the pivot axis Z3 in FIG. 2A to FIG. 2C) in a direction different from a direction of the first rotation axis.

The coupling unit may include at least one movable part (for example, the camera base part 12-1 and the camera orientation part 12-2 in FIG. 2A to FIG. 2C) smaller in volume than the body unit,
the image capture unit may be disposed at a predetermined surface of one (for example, the camera orientation part 12-2) of the at least one movable part, and
an angle between the direction of the first rotation axis and the direction of the second rotation axis may be substantially 90°.

The body unit and two or more of the movable parts may be coupled by a hinge with at least two axes.

The body unit and movable part may be coupled by a flexible arm.

A position may be provided at which a camera unit stops when the camera unit is rotating around a rotation axis (for example, the pivot axis Z1) in an attitude perpendicular to a length direction of the body unit, the camera unit stopping at this position before reaching a position beyond which the camera unit is not to rotate.

When the camera unit is rotating around the rotation axis (for example, the pivot axis Z1) in the attitude perpendicular to the length direction of the body unit, the camera unit may rotate through an angle greatly exceeding 180°.

An acceleration sensor or the like may be equipped at the movable part equipped with a camera (for example, the camera orientation part 12-2), the acceleration sensor identifying directions up, down, left and right and influencing the orientation of an image at the display unit. More specifically, for example, if an acceleration sensor or the like for identifying directions of the body unit 11 up, down, left and right is equipped at the body unit 11 side, the camera viewpoint image is displayed with consideration to the direction of the body unit 11 and the direction of the camera orientation part 12-2. As an alternative method, a method may be employed of calculating an angle between the body unit 11 and the camera orientation part 12-2 from a single sensor or plural sensors, combining the angle with values from an acceleration sensor and the like mounted at the body unit 11, and displaying the camera viewpoint image with consideration to the direction of the camera orientation part 12-2.

A stand may be included that is capable of fixing the body unit at different angles at which the body unit is not placed parallel or perpendicular to a ground surface.

The stand may include a rotation axis (for example, the pivot axis Z2), and the stand may rotate 180° to an attitude that is parallel with the body unit.

As a variant example, the body unit and camera unit may initially be separate.

In this case, the separated camera unit may include at least one movable part, the camera may be rotatable by plural rotation axes including a first pivot axis for changing the optical axis direction of the camera and a second pivot axis in a direction different from a direction of the first rotation axis, and an angle formed by the direction of the first rotation axis and the direction of the second rotation axis may be substantially 90°.

The movable part may be rotated by electric driving.

An acceleration sensor or the like may be equipped at the separated camera, the acceleration sensor identifying directions up, down, left and right and influencing the orientation of an image at the display unit.

A shutter remote control may be usable as a pen so as to enable easy writing and editing of text after image capture.

EXPLANATION OF REFERENCE NUMERALS

1 Information processing terminal
11 Body unit
11a Front surface
11b Rear surface
12 Coupling unit
12-1 Camera base part
12-2 Camera orientation part
13 Display unit
14 Stand
21 Camera
22 Projector
23 Stand
24 Markers
25 Car phone holder
26 Swivel cradle
27 Hanger attachment
28 Human detection sensors
51 Stepper motor
52 Stepper motor
53 Biaxial hinge
54 Gear
55 Gear
61 Motor driver
62 Motor driver
63 Rotation angle sensor
64 Rotation angle sensor
65 MCU 66 Wireless module
71 Driver
72 Driver
73 Driver
74 Driver
75 ADC
76 ADC
81 Wireless remote controller
82 Input driver
B Written matter
CL Clip
Fn Finger
K Keyboard
KB Wall
MD Window
Obj Object
P Pointer
QR QR code (registered trademark)
Scr Screen
Sun The sun
Tc Teacher
U User
Ug1, Ug2 Images of the user U
Z1, Z2, Z3, Z4 Pivot axes

The invention claimed is:

1. An information processing terminal comprising:
an image capture unit that captures an image of a subject;
a body unit, at a predetermined first surface of which a display unit is disposed, the display unit displaying a captured image captured by the image capture unit that includes the subject;
a hinge that is disposed at one of short sides of the body unit and rotatably supports the image capture unit with respect to the body unit to change an angle formed by an optical axis direction of the image capture unit and a normal direction of the display unit, the hinge including
a first rotation axis that is in parallel with a transverse direction of the display unit, and
a second rotation axis that is in parallel with a longitudinal direction of the display unit;
a recess that is provided at a second surface facing the first surface of the body unit in such a manner overlapping with the display unit in a thickness direction, and can accommodate the image capture unit and the second rotation axis in such a manner that the image capture unit and the second rotation axis overlap with the body unit in a thickness direction;
a first sensor that is disposed at the body unit and detects an orientation of the body unit;
a second sensor that is disposed at the image capture unit and detects an orientation of the image capture unit; and
a control unit that controls an orientation of the captured image of the display unit based on the orientation of the body unit detected by the first sensor and the orientation of the image capture unit detected by the second sensor,
wherein the image capture unit is configured to be rotatable around the first rotation axis from a position where the image capture unit is to be accommodated in the recess to a position where the image capture unit faces a direction of a short side opposite to the short side of the body unit, on a side of the first surface of the body unit, and
wherein, when causing the image capture unit to rotate around the second rotation axis, the first rotation axis is configured so as not to rotate according to rotation of the image capture unit.

* * * * *